US00RE42827E

(19) United States
(12) Reissued Patent
Moon et al.

(10) Patent Number: US RE42,827 E
(45) Date of Reissued Patent: Oct. 11, 2011

(54) APPARATUS AND METHOD FOR SYNCHRONIZING CHANNELS IN A WCDMA COMMUNICATION SYSTEM

(75) Inventors: Hi-Chan Moon, Seoul (KR); Chae-Man Lim, Seoul (KR); Seung-Joo Maeng, Kyonggi-do (KR); Soon-Young Yoon, Seoul (KR); Hyeon-Woo Lee, Kyonggi-do (KR); Hee-Won Kang, Seoul (KR); Jae-Min Ahn, Seoul (KR)

(73) Assignee: Samsung Electronics Co., Ltd (KR)

(21) Appl. No.: 11/440,402

(22) Filed: May 24, 2006

Related U.S. Patent Documents

Reissue of:
(64) Patent No.: 6,741,578
Issued: May 25, 2004
Appl. No.: 09/562,381
PCT Filed: May 1, 2000

(30) Foreign Application Priority Data

Apr. 29, 1999 (KR) ..... 1999-15332
May 25, 1999 (KR) ..... 1999-18921

(51) Int. Cl.
*H04B 7/216* (2006.01)
(52) U.S. Cl. ..... 370/335; 370/342
(58) Field of Classification Search ..... 370/335, 370/342
See application file for complete search history.

(56) References Cited

U.S. PATENT DOCUMENTS 5,179,571 A 1/1993 Schilling
(Continued)

FOREIGN PATENT DOCUMENTS

EP 0 852 430 7/1998
(Continued)

OTHER PUBLICATIONS

Nystrom et al., Comparison of Cell Search Methods for Asynchronous Wideband CDMA Cellular System, Oct. 1998, IEEE 1998 International Conference on Universal Personal Communications, vol. 2, pp. 783-784.*

(Continued)

*Primary Examiner* — Melanie Jagannathan
(74) *Attorney, Agent, or Firm* — The Farrell Law Firm, P.C.

(57) ABSTRACT

A synchronization (sync) code communication device for a CDMA communication system. A base station sync code transmission device comprises a primary sync code transmitter and a secondary sync code transmitter. The primary sync code transmitter is for generating and then transmitting a primary sync code at a first location in a transmission frame. The primary sync code is for acquiring synchronization at a starting point of a frame and the frame is equal to one period of a spreading code. The secondary sync code transmitter is for generating and then transmitting a secondary sync code at a second location in a frame. The secondary sync codes are assigned to base station groups, one to a group. A mobile station sync code receiving device comprises a primary sync code acquisition decider and a base station group decider. The primary sync code acquisition decider is for acquiring a primary sync code received at a first location in a frame, and then acquiring synchronization at a starting point of a frame. The base station group decider is enabled upon acquisition of the primary sync code, receives a secondary sync code transmitted at a second location in the frame, and then determines the base station group to which the transmitting base station belongs.

24 Claims, 23 Drawing Sheets

CONVENTIONAL SYNC CHANNEL STRUCTURE #1

$C_P$: PRIMARY SYNCHRONIZATION CODE
$C_S^{Lk}$: ONE OF 17 POSSIBLE SECONDARY SYNCHRONIZATION CODES
$(C_S^{L1}, C_S^{L2}, \cdots C_S^{L16})$ ENCODE CELL SPECIFIC LONG SCRAMBLING CODE GROUP I

U.S. PATENT DOCUMENTS

| | | | | | |
|---|---|---|---|---|---|
| 5,345,467 | A | | 9/1994 | Lomp et al. | |
| 5,528,599 | A | * | 6/1996 | Rodriguez et al. | 714/712 |
| 5,930,366 | A | * | 7/1999 | Jamal et al. | 370/509 |
| 6,144,653 | A | * | 11/2000 | Persson et al. | 370/337 |
| 6,233,466 | B1 | * | 5/2001 | Wong et al. | 455/562.1 |
| 6,246,673 | B1 | * | 6/2001 | Tiedemann et al. | 370/333 |
| 6,363,060 | B1 | * | 3/2002 | Sarkar | 370/342 |
| 6,480,558 | B1 | * | 11/2002 | Ottosson et al. | 375/350 |
| 6,483,826 | B1 | * | 11/2002 | Åkerberg | 370/335 |
| 6,741,578 | B1 | * | 5/2004 | Moon et al. | 370/335 |
| 6,804,311 | B1 | * | 10/2004 | Dabak et al. | 375/347 |
| 2001/0021199 | A1 | * | 9/2001 | Lee et al. | 370/503 |

FOREIGN PATENT DOCUMENTS

| | | | |
|---|---|---|---|
| JP | 3-14372 | * | 1/1991 |
| JP | 6-91547 | * | 11/1994 |
| JP | 11-17652 | * | 1/1999 |
| JP | 2000-324020 | * | 11/2000 |
| WO | WO 95/12931 | | 5/1995 |
| WO | WO 99/12273 | * | 3/1999 |
| WO | WO 99/12282 | * | 3/1999 |
| WO | WO 99/12295 | * | 3/1999 |
| WO | WO 00/67399 | * | 11/2000 |

OTHER PUBLICATIONS

Japanese Office Action dated Nov. 12, 2002, issued in a counterpart application, namely Appln. No. 2000-616143.*

* cited by examiner

CONVENTIONAL SYNC CHANNEL STRUCTURE #1

$C_P$: PRIMARY SYNCHRONIZATION CODE $C_S^{ik}$: ONE OF 17 POSSIBLE SECONDARY SYNCHRONIZATION CODES $(C_S^{i1}, C_S^{i2}, \cdots C_S^{i16})$ ENCODE CELL SPECIFIC LONG SCRAMBLING CODE GROUP I $C_P$: PRIMARY SYNCHRONIZATION CODE $C_S^{Lk}$: ONE OF 17 POSSIBLE SECONDARY SYNCHRONIZATION CODES $C_{S,}^{L1}, C_{S,}^{L2} \cdots C_S^{L16}$) ENCODE CELL SPECIFIC LONG SCRAMBLING CODE GROUP I SPREADING CODE USED FOR TIME SLOT i

| | 1 | 2 | 3 | 4 | 5 |
|---|---|---|---|---|---|
| C4[i] | 4 | 8 | 12 | 16 | 20 |
| C3[i] | 3 | 7 | 11 | 15 | 19 |
| C2[i] | 2 | 6 | 10 | 14 | 18 |
| C1[i] | 1 | 5 | 9 | 13 | 17 |

TIME SLOT i

FIG. 6

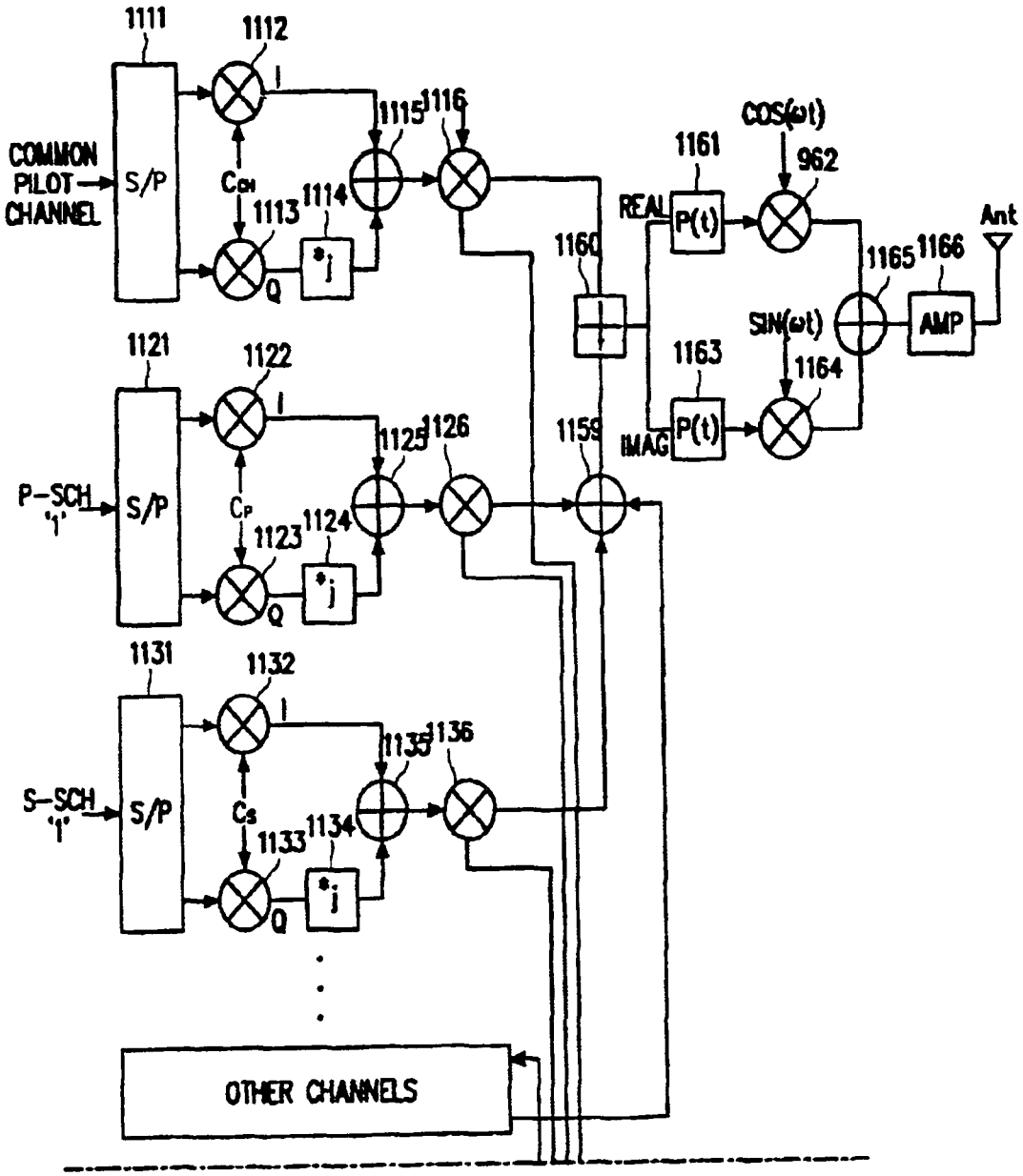
FIG. 11B1

APPARATUS AND METHOD FOR SYNCHRONIZING CHANNELS IN A WCDMA COMMUNICATION SYSTEM

Matter enclosed in heavy brackets [ ] appears in the original patent but forms no part of this reissue specification; matter printed in italics indicates the additions made by reissue.

PRIORITY

This application claims priority to an application entitled "Apparatus and Method for Synchronizing Channels in W-CDMA Communication System" filed in the Korean Industrial Property Office on Apr. 29, 1999 and assigned Serial No. 99-15332, and an application filed in the Korean Industrial Property Office on May 25, 1999, and assigned Serial No. 99-18921, the contents of both of which are hereby incorporated by reference.

BACKGROUND OF THE INVENTION

1. Field of the Invention

The present invention relates generally to a synchronizing device and method for a CDMA (Code Division Multiple Access) communication system, and in particular, to a device and method for synchronizing channels in a W-CDMA (Wideband-CDMA) communication system.

2. Description of the Related Art

Next generation W-CDMA mobile communication systems assign unique base station codes to each base station to perform asynchronous operation between the base stations. For 512 cells, 512 unique codes are assigned to identify 512 base stations. In such an asynchronous mode base station communication system, a mobile station detects the base station signal being currently received at the highest power, in order to successfully perform a call. However, in the asynchronous base station system, it takes quite a long time to examine the phases of all the possible codes in the cell search, so that it is difficult to apply a general cell search algorithm. Therefore, a multi-step cell search algorithm has been proposed. This method classifies 512 cells into 32 groups and each group includes 16 cells. To employ this method, sync channels are used which include a primary sync channel signal (code) and a secondary sync channel signal (code).

FIG. 1 shows a sync channel structure used for cell search in an asynchronous W-CDMA system. In FIG. 1, reference numeral 1-1 denotes a primary sync channel (PRIMARY SCH) signal, reference numeral 1-3 denotes a secondary sync channel (SECONDARY SCH) signal, and reference numeral 1-5 denotes a common pilot channel signal. One frame has 16 slots. The primary sync channel signal and the secondary sync channel signal are transmitted for a N-chip (256 chip) length at the starting point of every slot. Orthogonality between the two channel signals is maintained so that they can be transmitted at the same time. Further, the common pilot channel uses a unique PN (Pseudo Noise) code (spreading code) for each base station, and the period of the PN code is identical to one-frame length.

The W-CDMA system having the above channel structure uses Gold codes of period $2^{18}-1$ for the unique PN codes, and uses only M (=512) codes out of all possible Gold codes of that length. The common pilot channel signal is not transmitted simultaneously with the primary sync channel signal and the secondary sync channel signal, but only transmitted at other time periods.

The sync channels use sync codes, and the sync codes are generated by performing modulo operation between a Hadamard sequence and a hierarchical sequence. The hierarchical sequence y is generated using a sequence $x_1$ of length $n_1$ and a sequence $x_2$ of length $n_2$, as follows:

$$y(i)=x_2(i \bmod n_2)+x_1(i+n_1) \text{ for } i=0, \ldots, (n_1*n_2)-1$$

Further, the sequences $x_1$ and $x_2$ are select sequences of length 16 as follows.

$$x_1=<0,0,1,1,0,1,0,1,1,1,1,1,0,0,0,1>$$

$$x_2=<0,0,1,1,1,1,0,1,0,0,1,0,0,0,1,0>$$

The Hadamard sequences are obtained as the rows in a matrix $H_8$ constructed recursively by:

$$H_k=\begin{pmatrix} H_{k-1} & H_{k-1} \\ H_{k-2} & H_{k-1} \end{pmatrix}, k \geq 1$$

The rows are numbered from top starting with row 0 (the all ones sequence). The nth Hadamard sequence is denoted as the nth row of $H_8$ numbered from the top, n=0,1,2, . . . , 255, in the sequel.

Therefore, let $h_m(i)$ and y(i) denote the ith symbol of the sequence $h_n$ and y, respectively where i=0, 1, 2 . . . , 255 and i=0 corresponds to the leftmost symbol.

By XOR-gating a 256-chip Hadamard sequence $h_m(i)$ and the hierarchical sequence y(i), a kth sync code is then defined as $$C_{sc.\,k}=\{h_m(0)+y(0), h_m(1)+y(1), h_m(2)+y(2), \ldots, h_m(255)+y(255)\},$$

Where m=8×k, k=0,1,2, . . . , 17, and the leftmost chip in the sequence corresponds to the chip transmitted first in time.

Then, synchronization code #0 generated in the above manner is assigned to the P-SCH signal, where $$C_p=C_{sc.\,0}$$

The other synchronization codes, $C_{sc.\,1}$ to $C_{sc,\,17}$ are assigned in the respective slots of a secondary sync (S-SCH) signal.

The primary sync code $c_p$ is repeatedly transmitted only for 256 chips every slot, which is 1/10 of one slot. The sync code used for the primary sync channel signal is the same for every cell. The primary sync channel signal is used for detecting the slot timing of the received signal by the mobile station. The base station transmitter introduces a comma-free code when transmitting the secondary sync channel. The comma-free code is comprised of 32 code words, and each code word is comprised of 16 symbols and transmitted repeatedly in every frame. However, the 16 symbol values are not transmitted as they are, but each symbol value is mapped into a secondary sync code and is transmitted for frame synchronization and base station group information. The mobile stations have the comma free code table and know the mapping relation of the symbols and secondary sync codes. As shown in FIG. 1, an ith sync code, corresponding to a symbol value 'i', is transmitted every slot. $C_s^{i,k}$ indicates the ith secondary synchronization code inserted in the kth slot. The 32 code words of the comma-free code identify 32 groups, and the comma-free code has a unique cyclic shift feature for each code word. Therefore, it is possible to obtain information about the code groups and frame synchronization using the secondary sync channel signal (code). Here, "frame synchronization" refers to synchronization of timing or phase within one period of a PN spreading code in a spreading spectrum system. However, in the existing W-CDMA system, since both one period of the spreading code and the frame length are equal to 10 ms, this PN code synchronization will be referred to as frame synchronization.

In the mobile station, a correlation value is calculated for a spreading code of a base station in order to distinguish different base station codes used by different base stations. Forward common channels, such as a pilot channel and a broadcasting channel (BCH), can be used when calculating the correlation value for the spreading code of the base station. In the conventional W-CDMA system, the pilot symbol is transmitted on the broadcasting channel using Time Division Multiplexing (TDM). However, the recent harmonization group OHG (Organized Harmonization Group) recommends transmitting the forward common pilot. FIG. 1 shows an example where the forward common pilot channel is transmitted by CDM (Code Division Multiplexing) and transmission of the pilot channel is discontinued when the sync code is transmitted.

FIG. 2 shows an example where the forward common pilot channel signal is transmitted by CDM and the pilot channel signal is continuously transmitted without discontinuation even when the sync channel signals are transmitted.

The common pilot channel signal can transmit the pilot symbol and data using time division multiplexing in every slot (the existing W-CDMA structure). Otherwise, there may be provided separate channels for transmitting the data. In this case, the channel frame for transmitting data should have the same boundary as the common pilot channel frame. Generally, the common pilot channel does not transmit data, but only transmits the pilot symbol, all +1 or −1.

In the synchronization process of the conventional W-CDMA system, the synchronization is acquired through three search steps. In the first step, synchronization of the 0.625 ms slot is acquired. In the second step, frame synchronization is acquired and group identification is performed. In the third step, the spreading code (the specific base station code) used in the group is decided.

However, in the conventional synchronization process, when performing the frame synchronization and group identification of the second step, the secondary sync channel is undesirably monitored for a period of 10 ms. That is, in a conventional CDMA communication system, it is not possible to acquire frame synchronization within one period of the spreading code. Further, in the W-CDMA communication system, it is not possible to perform synchronous communication using only one sync channel. Therefore, in a conventional CDMA communication system, the frequent repetitions of transmitting the sync code makes it impossible to minimize interference on the forward link. Accordingly, it is not possible to increase the system capacity.

In addition, in the conventional system, in order to synchronize information about a code group with a frame, the secondary sync channel must be received continuously during one frame. The present invention aims at reducing the overall synchronization time by minimizing the time required for receiving the secondary sync channel.

SUMMARY OF THE INVENTION

It is, therefore, an object of the present invention to provide a device and method for minimizing communication of the sync channel signal while acquiring synchronization in a W-CDMA communication system.

It is another object of the present invention to provide a synchronization device and method for a base station in a W-CDMA communication system, wherein a primary sync code for frame synchronization is transmitted at a predetermined location within a one frame period, and a secondary sync code corresponding to the code group to which the base station belongs is transmitted at a location predetermined chip size distance from the primary sync code.

It is further another object of the present invention to provide a synchronization device and method for a base station in a W-CDMA communication system, wherein a primary sync code for frame synchronization is transmitted at a predetermined location within a one frame period, and a secondary sync code corresponding to the code group to which the base station belongs, is transmitted at a previously set location after the primary sync code.

It is yet another object of the present invention to provide a synchronization device and method for a base station in a W-CDMA communication system having a plurality of antennas which support a transmit diversity function, wherein a primary sync code for frame synchronization is transmitted through the antennas at a predetermined location within a one frame period, and a secondary sync code corresponding to the code group, to which the base station belongs, is transmitted at a previously set location after the primary sync code.

It is still another object of the present invention to provide a synchronization, device and method for a base station in a W-CDMA communication system, wherein every base station uses the same spreading code instead of a secondary sync channel code, and each base station transmits a primary sync channel code at a predetermined offset location within a frame length.

It is yet still another object of the present invention to provide a synchronization device and method for a mobile station in a W-CDMA communication system having a base station which transmits a primary sync channel code for frame synchronization at a predetermined location, which is known at the mobile station by a predetermined mobile communication standard, within a one frame period and transmits a secondary sync channel code corresponding to the code group, to which the base station belongs, at a location a predetermined chip size distance from the primary sync channel code, wherein the synchronization device and method determines whether frame synchronization is acquired or not by acquiring the received primary sync channel code and then determines the secondary sync channel code, after acquisition of the primary sync channel, to determine a code group.

In accordance with one aspect of the present invention, a sync channel transmission device for a base station in an asynchronous CDMA communication system comprises a primary sync channel transmitter for generating a primary sync code to indicate the starting point of one frame, said frame equaling one period of a spreading code of common pilot channel, and transmitting the primary sync code at a first location in the frame; and a secondary sync channel transmitter for generating a secondary sync code assigned to the group of base stations to which the base station belongs, and transmitting the secondary sync code at a second location in the frame.

In accordance with another aspect of the present invention, a sync channel receiving device for a mobile station in an asynchronous W-CDMA system comprises a primary sync channel acquisition decider for acquiring a primary sync channel code received at a first location in a frame, and acquiring synchronization for the starting point of a frame, said frame equaling one period of a spreading code of common pilot channel; and a code group decider receives a secondary sync channel code transmitted at a second location in the frame, and determining the base station group to which the corresponding base station belongs by the distance of the primary synchronization code and secondary synchronization.

BRIEF DESCRIPTION OF THE DRAWINGS

The above and other objects, features and advantages of the present invention will become more apparent from the following detailed description when taken in conjunction with the accompanying drawings in which:

FIG. 6 is a diagram illustrating a time slot and sync code assignment table used in the sync channel structure according to the second embodiment of the present invention;

DETAILED DESCRIPTION OF THE PREFERRED EMBODIMENT

Figure 1:
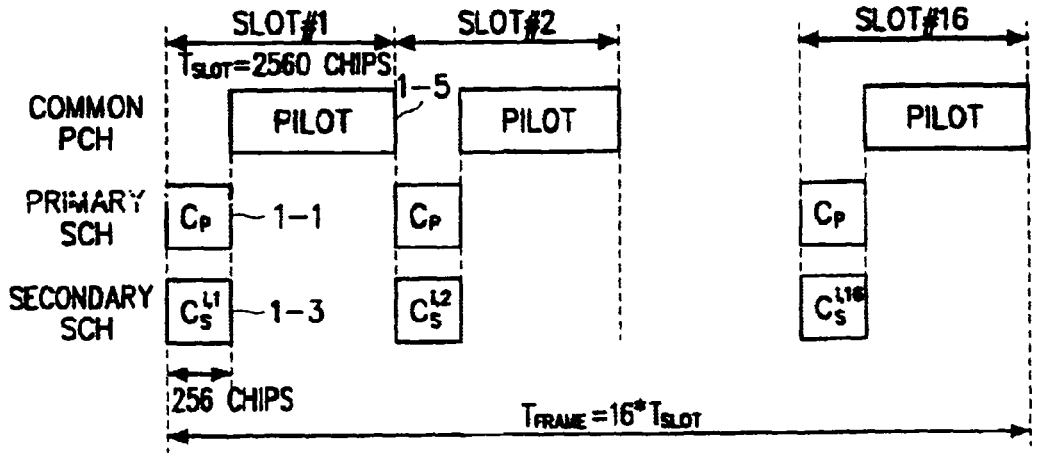
FIG. 1 is a diagram illustrating a sync channel structure of a conventional W-CDMA communication system.
Figure 2:
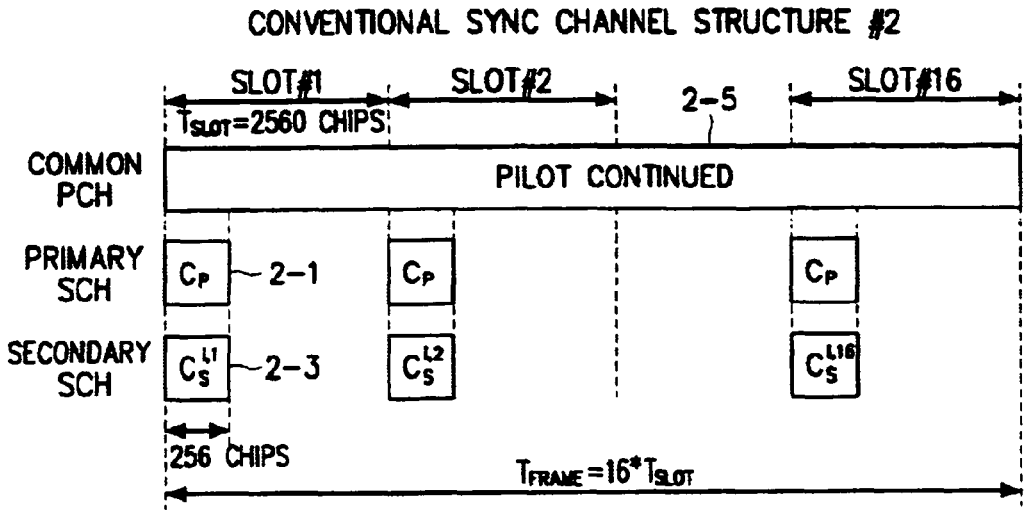
FIG. 2 is a diagram illustrating another sync channel structure of a conventional W-CDMA communication system.

A preferred embodiment of the present invention will be described herein below with reference to the accompanying drawings. In the following description, well-known functions or constructions are not described in detail since they would obscure the invention in unnecessary detail.

In the following description, every base station shares the same code for the primary sync code transmitted over a primary sync channel. in addition, the secondary sync code transmitted over the secondary sync channel indicates a code group of the base stations.

The present invention relates to initial synchronization in a CDMA communication system. As in the conventional W-CDMA system, the base stations are identified by unique spreading codes, which are classified into several groups. For example, a base station can spread a forward link using 512 unique spreading codes, which can be classified into 32 groups. Thus, each group includes 16 spreading codes. A mobile station performs initial acquisition and cell search without knowing the time sync or which spreading code the base station is presently using. Moreover, it is very difficult for the mobile station to acquire initial acquisition because the mobile station must test all the possible hypotheses without having either the spreading code information or the initial time sync information. Therefore, in this situation, there is a need for the mobile station to effectively acquire initial acquisition.

The present invention proposes a method which acquires synchronization at a boundary of one period of a frame which is one spreading code period using at least one primary sync channel code inserted every period of the frame, receives the primary sync channel code every period of the frame, and thereafter detects at least one secondary sync channel code received with or without a time delay, thereby identifying the group to which the base station belongs based on the secondary sync channel code. The secondary sync channel code is unique to all the base stations in a base station group. Therefore, the mobile station can identify the base station group by detecting the secondary sync channel code. Further, the invention proposes a sync channel structure which can effectively perform frame synchronization and group identification of a spreading sequence. In the following W-CDMA system examples, one period of a spreading code used in the forward link is identical to the frame length. Herein, "frame synchronization" refers to acquiring synchronization for transmission timing within one period of the spreading code.

Further, the present invention proposes a scheme in which a code for the primary sync channel is transmitted one or more times every period or frame of the spreading code, and a code for the secondary sync channel is transmitted either at the same time as the code for the primary sync channel or with a time delay after transmission of the code for the primary sync channel. Here, in order to enable the receiver to easily acquire the transmitted sync channel codes, the primary sync channel signal (code) is transmitted as the PN code which is commonly used by every base station, and the secondary sync channel signal (code) is transmitted as the spreading sequence or a code for group identification. The secondary sync channel code is unique for all the base stations in a base station group.

The receiver attempts to acquire the primary sync channel code, and when the mobile station succeeds in acquisition of the primary sync channel code, synchronization is acquired for the boundary of the spreading code (i.e., a boundary of the frame). At this point, we assume the base station transmits the primary sync code at the starting point of the frame or with a predetermined time delay, which is previously determined for the entire system, so that it is known by all base stations and the all mobile stations.

Thereafter, it is necessary for the mobile station to detect the group to which the transmitting base station belongs, and the spreading code which is being used for spreading pilot channel signal. The mobile station distinguishes the group of the base station by detecting the secondary sync channel code. For the secondary sync channel, each group has a unique code. For group identification, the codes used for the secondary sync channel of each base station group can be either orthogonal or not orthogonal with each other. It is possible to simply implement the receiver using fast Hadamard transform (FHT), while securing an orthogonality as between the codes. The receiver despreads a received signal including secondary sync codes on the secondary sync channel and selects the secondary sync code having the highest energy (i.e., a group having a higher probability), and then decides the selected group is the group to which the transmitting base station belongs. After finding out which secondary sync code is being used by the transmitting base station, the mobile station performs despreading on all the possible spreading codes of the group to which the base station belongs, and selects a spreading code having the highest probability according to the despreading results. Here, it is possible to detect at least one of the spreading code used in one group through the forward common channels such as the pilot channel or the broadcasting channel.

Figure 3A:
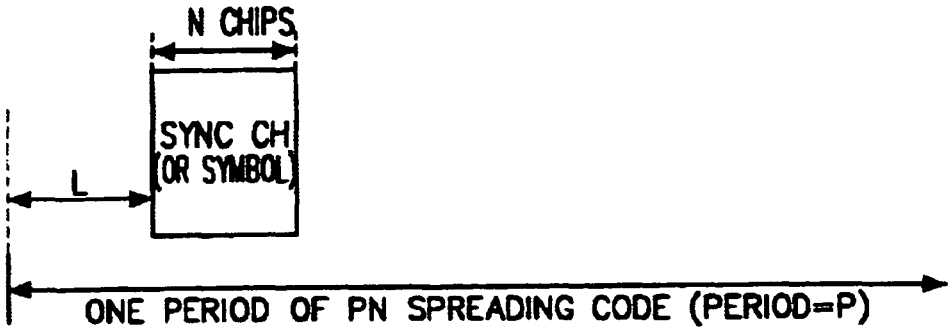
FIGS. 3A to 3C are diagrams illustrating several methods for generating one sync channel within one period of a spreading code according to an embodiment of the present invention.
Figure 3B:
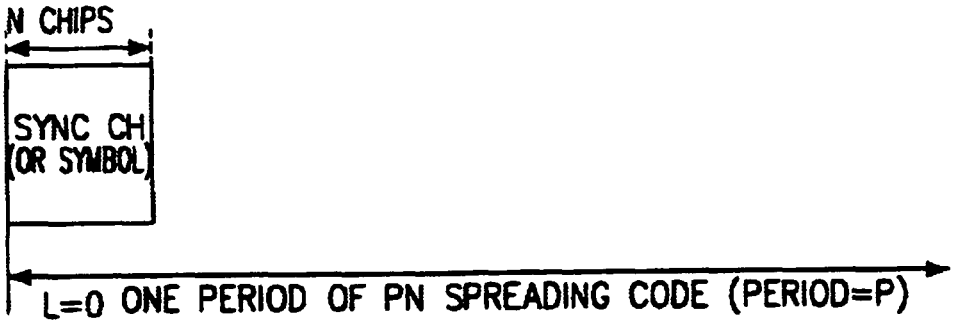
Figure 3C:
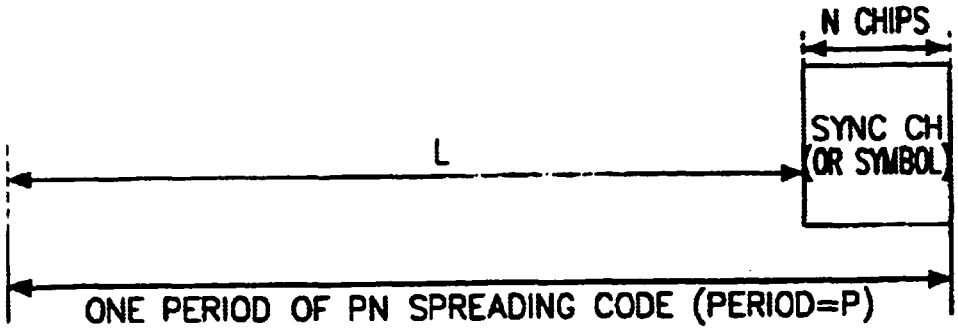

FIGS. 3A to 3C show a sync channel structure for frame synchronization according to an embodiment of the present invention. Referring to FIGS. 3A to 3C, "frame synchronization" refers to a procedure for acquiring timing synchronization within one period of a spreading code in a spread spectrum system. FIGS. 3A to 3C show a case where a sync channel signal is transmitted at a specific location of a spreading code period in the spread spectrum system. A receiver corresponding to a transmitter having the above channel structure first acquires a sync channel signal and thereafter automatically acquires frame synchronization. Herein, "frame synchronization" refers to synchronization for initial timing or phase within one period of a PN spreading code in the spread spectrum system. However, in the existing W-CDMA system, since one period and the frame length of the spreading code are both equal to 10 ms, to find the start time of 10 ms will be referred to as frame synchronization. At this point, the sync channel signal can be acquired using the conventional matching filter. When comparing this with the synchronization process in the conventional W-CDMA, it is possible to acquire frame synchronization in a single process, using one sync channel at a low frequency. In this context, frequency refers to the number of transmissions, and low frequency means fewer repeated transmissions.

FIG. 3A shows a method for transmitting a sync channel at a predetermined location within one period of a spreading code in a spread spectrum system using a spreading code of period P. Here, "predetermined location" refers to a location a specific length L away from the starting point (i.e., initial state) of one period of the spreading code, wherein the value L is predetermined value known by both the transmission side and the receiving side. The sync channel signal is transmitted for a length of N chips, and it is assumed herein that the sync channel signal is transmitted for 256 chips. The receiver acquires the sync channel signal using the matching filter. After acquisition of the sync channel signal, the receiver can automatically acquire synchronization for timing of the PN spreading code. That is, it is noted that the starting point of one period of the spreading code (i.e., a starting point of the frame) begins at L chips before the acquired sync channel.

FIG. 3B shows a case where L=0. That is, shown is a case where a starting point of the sync channel signal is concurrent with a starting point of a period of the spreading code. FIG. 3C shows a case where for L=P−N, an ending point of the sync channel signal is concurrent with a starting point of a next period of the spreading code.

In the case where there is only one PN code used for a spreading code, completing acquisition of the sync channel signal is equivalent to completing acquisition of a spreading code. However, in the case where there are several PN codes used for the spreading code, each base station having its own unique spreading code, acquisition for the spreading code is performed in two steps as follows. The receiver first performs acquisition on the sync channel. When timing for the sync channel is acquired, the mobile station does not know which spreading code is used, but has already acquired information about a phase (or timing) of the spreading code. The receiver calculates correlation values by performing despreading on all the possible spreading codes using the timing information to detect the maximum value out of the calculated correlation values, or to detect the used spreading code by comparing the values with a threshold value or combining the values, so as to acquire final synchronization.

FIGS. 3A to 3C show the cases where the sync channel signal is transmitted only once in one period of the spreading code. However, it is also possible to acquire timing of the spreading code using the sync channel even in the case where the sync channel signal is transmitted only once over several periods of the spreading code. Alternatively, the sync channel signal can be transmitted several times within one period of the spreading code.

Figure 4:
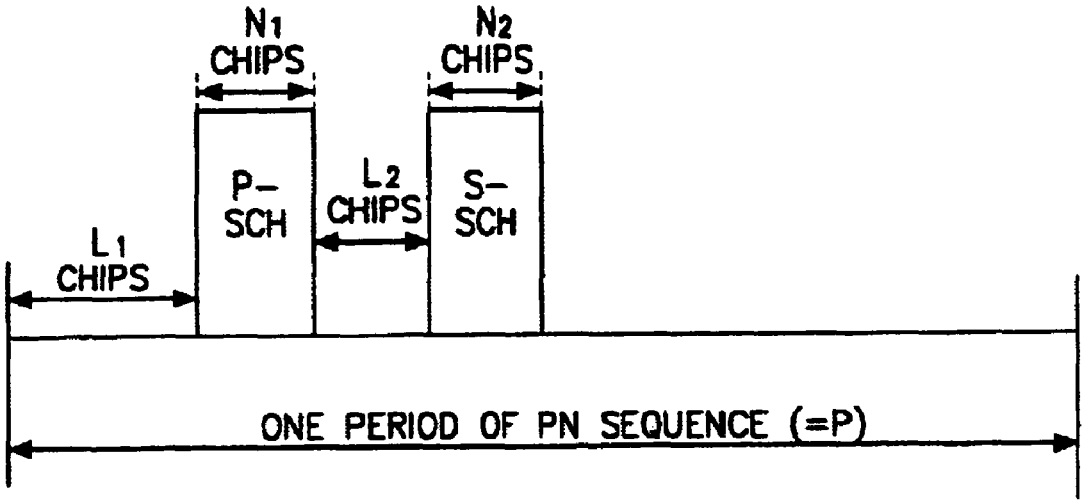
FIG. 4 is a diagram illustrating a sync channel structure according to a first embodiment of the present invention.

FIG. 4 shows a sync channel structure according to a first embodiment of the present invention. Referring to FIG. 4, the base station transmits a primary sync code and a secondary sync code for one period of PN sequence. The primary sync code has a length of N-chip period and the secondary sync code has a length of $N_2$-chip period. In the embodiments of the present invention described below, it will be assumed that $N_1=N_2=256$ chips.

Referring to FIG. 4, the primary sync code is transmitted $L_1$ chips after a boundary of the frame (i.e., a starting point of one frame) or after a boundary of one period of the spreading code. In some cases, the $L_1$ value can be 0, resulting in the primary sync code being transmitted at the boundary of the frame. In addition, the secondary sync code is transmitted $L_2$ chips after the ending point of the primary sync code. The secondary sync code and the group to whiCh the base station belongs, correspond to each other according to a predetermined mapping rule (i.e., first secondary code indicate first group). Therefore, when the mobile station detects the secondary sync code, the mobile station can identify the group to which the base station belongs.

In order to enable coherent demodulation by transmitting the primary sync code and the secondary sync code through the same antenna, it is preferable to transmit the $L_2$-chip interval between the two sync codes within a coherent time. In FIG. 4, $L_2$ is the guard interval between the primary sync code and the secondary sync code. In the first embodiment of the present invention, it is assumed that the interval $L_2$ between the two sync code is 256 chips. Here, it is also possible to set $L_2=0$ to consecutively transmit the secondary sync code after transmission of the primary sync code. However, when the mobile station attempts to detect the secondary sync code immediately after detecting the primary sync code, it is possible to permit a slight time interval so that the mobile station can detect the secondary sync code with a slight time delay. A detailed description of this will be made later with reference to a description of the receiver.

Figure 5:
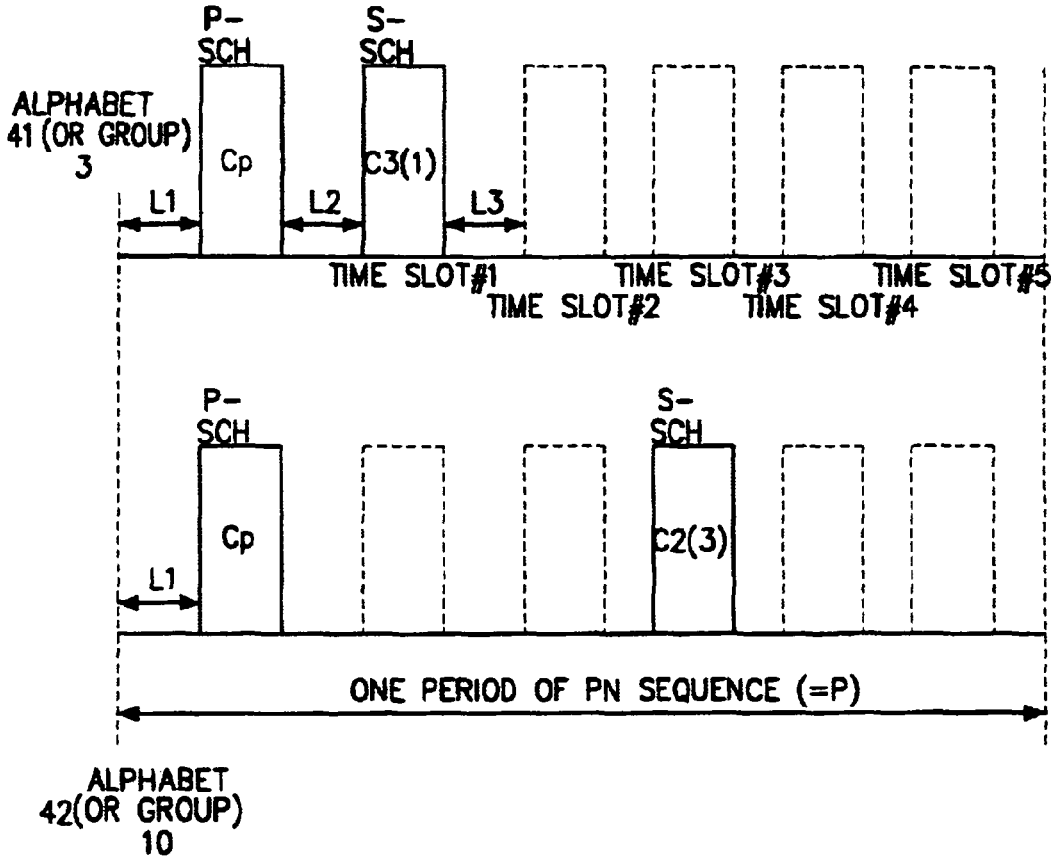
FIG. 5 is a diagram illustrating a sync channel structure according to a second embodiment of the present invention.

FIG. 5 shows a sync channel structure according to a second embodiment of the present invention. In the sync channel structure according to the first embodiment of FIG. 4, the secondary sync code is identified using the different spreading codes. However, in the sync channel structure according to the second embodiment of FIG. 5, groups (alphabets) of the secondary sync codes can be given in combination of different starting time. In addition, FIG. 6 shows alphabet allocation for the secondary sync code in the sync channel structure according to the second embodiment.

Referring to FIG. 5, if the number of alphabets for the secondary sync code used for group identification of the base station is X, those are identified in (m*n) combinations ($X \leqq m*n$) of ($T_1$–$T_m$) time slots and ($C_1$–$C_n$) different spreading codes. In FIG. 6, it is .assumed that the number of alphabets is 20, the number of used time slots is m=5, and the number of spreading codes used for one time slot is n=4. The term "alphabet" refers to the number of signals available for one symbol to transmit information about the code group or frame synchronization over the secondary sync code. Alphabets corresponds to groups. In the present invention, it is assumed that each second sync code is transmitted by repeating the code group information and the receiver can identify the code group to which the base station belongs, even though the receiver receives only a single code.

When a secondary sync code related to an alphabet is determined in the above sync channel structure, the time slots in which to transmit, as indicated by the alphabet allocation for the sync channel, shown in FIG. 6, and the spreading codes to be used at that time are determined. After transmission of the primary sync code, the secondary sync code will be transmitted with a designated code at a designated time slot. Here, the sync codes used for one time slot can be orthogonal to each other. In addition, to avoid a collision between the signals from different neighbor base stations (i.e., to avoid performance degradation due to cross-correlation coefficients), it is possible to have the groups of the codes used for the different time slots become exclusive to each other. The reason for distributing transmission of the alphabets (codes) in the second dimension of time and code is because there are too many possible codes for the secondary sync code to be despread at one time slot. By distributing the alphabets in combination of the time slots and the spreading codes, when the receiver performs simultaneous despreading, the number of the codes to be tested is drastically reduced.

In FIG. 5, reference numeral 41 shows a case where a used alphabet (or a group of the spreading code) is 3, and reference numeral 42 shows a case where a used alphabet (or a group of the spreading code) is 10. Here, if the alphabet to be transmitted over the secondary sync channel is 3 (in this case, it is identical to an ID of the group), the secondary sync code transmitted by the base station is transmitted at the first time slot according to alphabet assignment of FIG. 6 and at this time, the third code $C_3$[i] is transmitted. Here, 'i' in the brackets indicates that the transmitted code can vary according to the time slot. That is, it means that the code to be transmitted can vary at each time slot. Thus, $C_3$[1] is not only transmitted at a different slot than $C_3$[2], but is also a different code. Further, when an alphabet of the secondary sync channel to be transmitted is 10 as shown by reference numeral 42, the third time slot and the second spreading code $C_2$[3] are assigned according to alphabet allocation of FIG. 6.

Therefore, when the base station transmits the secondary sync channel, which is $C_2$[3], at the third time slot to transmit the alphabet 10 as shown by reference numeral 42 of FIG. 5, the mobile station can find out the information about the code group to which the base station belongs, by detecting $C_2$ at the third time slot. Thereafter, the mobile station should detect which spreading codes are used in the group to which the base station belongs. To this end, the mobile station performs despreading on all the possible spreading codes of the group to which the base station belongs and selects the spreading code having the highest possibility. At this point, the mobile station can use the forward common channels such as the pilot channel and the broadcasting channel in order to determine the used spreading code in one group. In the embodiment of FIG. 5, there exists an interval of $L_3$ chips between the time slots. This is to spare a time to the receiver in demodulating the next slot after demodulating a signal on the previous slot using the same hardware. However, the interval $L_3$ between the time slots can be set to 0, or the time slots can be overlapped. Of course, in this case, the receiver will be more complex in structure (i.e., have two demodulators), as compared with the case where there exists an interval between the time slots.

In the embodiments of FIGS. 4 and 5, the base station transmits the primary sync channel once in one period or one-frame duration of the spreading code for the forward link, and the mobile station acquires synchronization for this to acquire timing or frame synchronization of the spreading code. Thereafter, the code group is determined through the secondary sync channel. The secondary sync channel can be transmitted at least once. Transmitting more than once provides time diversity, and, thus, provides more reliability when receiving the secondary sync channel. In particular, when the base station transmits the forward link using two or more antennas, it is possible to obtain an antenna diversity effect by alternately transmitting the symbols through the antennas.

Unlike the embodiments stated above, the base station can transmit the primary sync code two or more times in one-frame period. This is reduce the overall acquisition time by increasing a synchronization speed of the primary sync channel. That is, the primary sync code is transmitted NUM_PRI times every one period or one-frame length of the PN spreading sequence, and only one of them is acquired to perform sync acquisition. However, at this point, it is not possible to acquire synchronization of the spreading sequence (or synchronization of the frame) at the locations of the NUM_PRI primary sync channels. That is, acquisition of frame synchronization and group detection is performed by analyzing information about the secondary sync channel. In the third and fourth embodiments of the present invention, a description will be made with reference to a case where the number of alphabets required for the secondary sync code is NUM_PRI*NUM_GROUP. Here, NUM_GROUP denotes the number of groups for classifying the spreading codes of the base station. The reason that so many alphabets for the secondary sync code are required is because it is necessary to identify the ID of the groups and acquire synchronization of one frame out of NUM-PRI candidates. The invention is different from the existing W-CDMA sync channel in that one symbol (the secondary sync channel is composed of one symbol) of one frame is demodulated in the second step in order to acquire synchronization of group and frame. However, the sync channel structure according to the present invention is advantageous against the existing W-CDMA sync channel structure in that it is possible to perform determination of the group ID and acquisition of frame synchronization even if only one secondary sync channel is received.

Figure 7A:
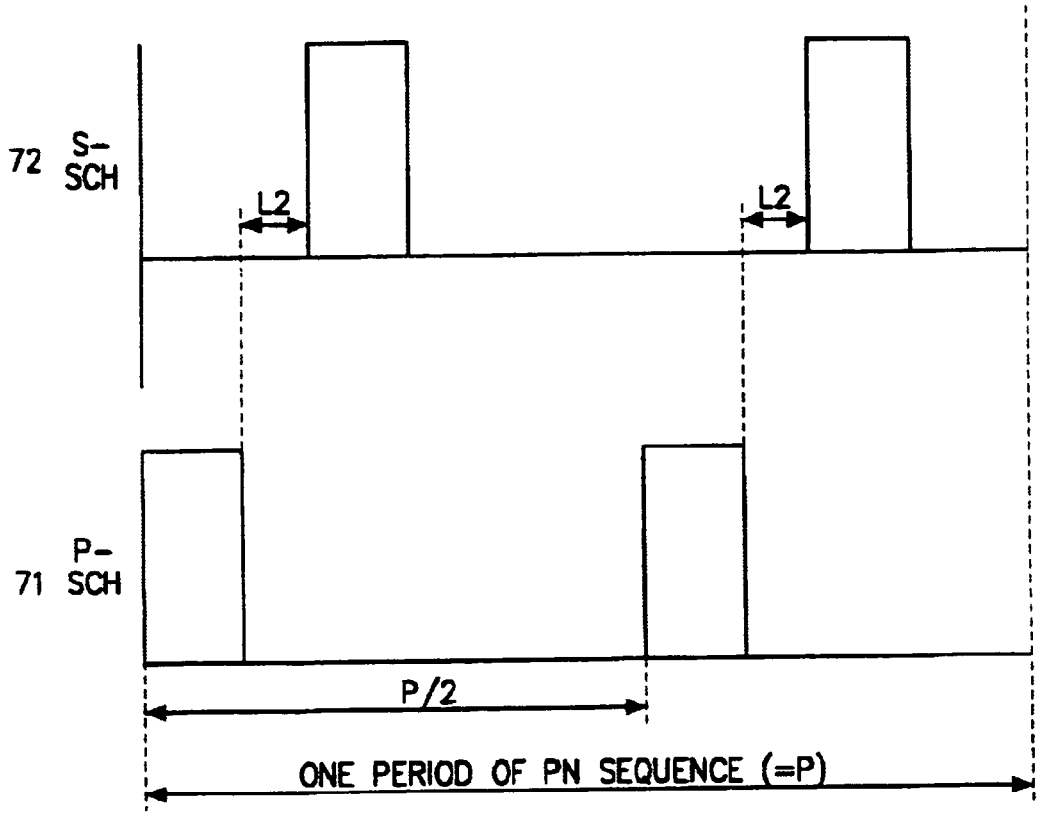
FIG. 7A is a diagram illustrating a sync channel structure according to a third embodiment of the present invention.

FIG. 7A shows a sync channel structure according to a third embodiment of the present invention, wherein NUM_PRI is 2.

Referring to FIG. 7A, the base station transmits the primary sync channel twice in one-frame period as shown by reference numeral 71 of FIG. 7A. Here, it is assumed that a time interval between transmitting the primary sync code is half of one period P (i.e., P/2) of the spreading sequence as shown by reference numeral 71, and the $L_1$ value is 0. However, $L_1$ can have a specific value and the transmission interval of the primary sync channel in the one-frame period can be set to a value other than P/2. The base station transmits the secondary sync code at a location being part by $L_2$ shown by reference numeral 72 of FIG. 7A after transmission of the primary sync code. The $L_2$ value can be 0, when necessary.

In FIG. 7A, the secondary sync code can be located at the center of the symbols of two consecutive primary sync codes. However, in the embodiment of the present invention, it is assumed that the secondary sync code is transmitted 256 chips after completing transmission of the primary sync code ($L_2$=256). By doing so, the invention has the following advantages.

The reason that the base station consecutively transmits the primary sync code and the secondary sync code is because the base station can coherently demodulate the secondary sync code by performing channel estimation using the primary sync code when detecting the secondary sync code after acquiring the primary sync code. Of course, when the receiver has a great frequency offset, it is not possible to perform coherent detection. However, when the frequency offset is smaller or when an initial frequency offset can be reduced to some extent using an automatic frequency controller (AFC), it is possible to perform coherent detection. That is, when the frequency offset is great during, for example, initial acquisition, coherent demodulation is unavailable. However, during neighbor cell search and finger allocation, coherent demodulation is available. In addition, the $L_2$ value can be set higher than 0. For example, it is possible to leave an interval of 256 chips (=1 symbol) when the primary sync code and the secondary sync code are consecutively transmitted as stated above, it is possible not only to perform coherent demodulation but also to minimize a synchronization time by attempting to detect the secondary sync code immediately after acquiring the primary sync code having high power.

A primary goal of the present invention is to set a time interval between the primary sync code and the secondary sync code within a coherent time so that channel estimation is performed using the primary sync code to coherently demodulate the secondary sync code. Further, a slight time interval is permitted between the primary sync code and the secondary sync code to acquire the secondary sync code immediately after a slight delay for determination when the primary sync code is acquired with reliability. That is, it is possible to reduce the overall search time by minimizing the interval between the primary sync code and the secondary sync code, considering a slight processing delay of the mobile station.

The number of alphabets transmitted over the secondary sync channel is assumed to be NUM_PRI*NUM_GROUP. This is to acquire information about code group and frame synchronization even if only one secondary sync code is received.

Figure 7B:
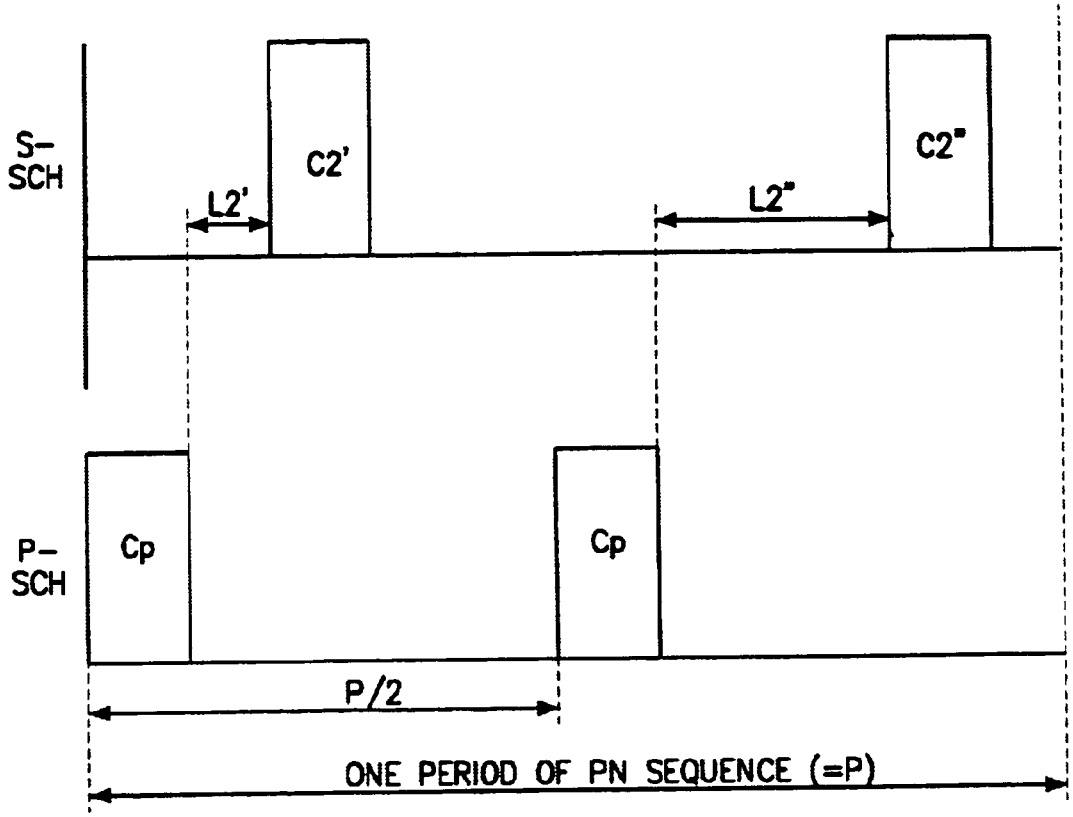
FIG. 7B is a diagram illustrating a sync channel structure according to a fourth embodiment of the present invention.

FIG. 7B shows a sync channel structure according to a fourth embodiment of the present invention. The sync channel structure of FIG. 7B employs the method, shown in FIG. 6, of transmitting the secondary sync code by assigning the time slots and alphabets. Although the sync channel structure shown in FIG. 7B is identical to that of FIG. 7A in that a plurality of the primary sync codes and the secondary sync codes are transmitted in one-frame period, time intervals $L_{2'}$ and $L_{2''}$ between the primary sync code and the secondary sync code can be different from each other. This is because the primary and secondary sync codes may transmit different alphabets to transmit different frame sync information. An increase in the frequency NUM_PRI of transmitting the primary sync code causes an increase in amount of the sync information of the frame to be transmitted to the secondary sync code, and when one secondary sync code code includes both the group information and the frame sync information as in an embodiment of the present invention, the number of alphabets to be transmitted over the secondary sync channel increases drastically. That is, when there exist 32 groups and the primary sync code is transmitted four times in one-frame period, the number of alphabets to be transmitted AT the secondary sync code increases to 128. Further, when the primary sync code is transmitted eight times in one-frame period, the number of alphabets to be transmitted to the secondary sync code increases to 256. This method may increase complexity of the receiver.

When the alphabets of the secondary sync channel are transmitted by assigning time slots and spreading codes, the number of spreading codes to be simultaneously despread is decreased. Therefore, it is possible to decrease complexity of the mobile station. The time slots and spreading codes can be assigned such that the time slots should indicate sync information of the frame and the spreading code should indicate information about the group to which the base station belongs. On the other hand, the time slots and spreading codes can be assigned such that the time slots should indicate information about the group to which the base station belongs and the spreading code should indicate sync information of the frame. Here, "sync information of the frame" means information about a location where the previous primary sync code has a specific offset value within one frame.

In the CDMA system, the base station can employ antenna diversity which transmits a signal using several antennas. Although FIGS. 8A and 8B show a case where the primary sync code and the secondary sync code are transmitted twice in a one-frame period, the invention can be applied even to a case where the primary sync code and the secondary sync code are transmitted more than twice in the one-frame period.

Figure 8A:
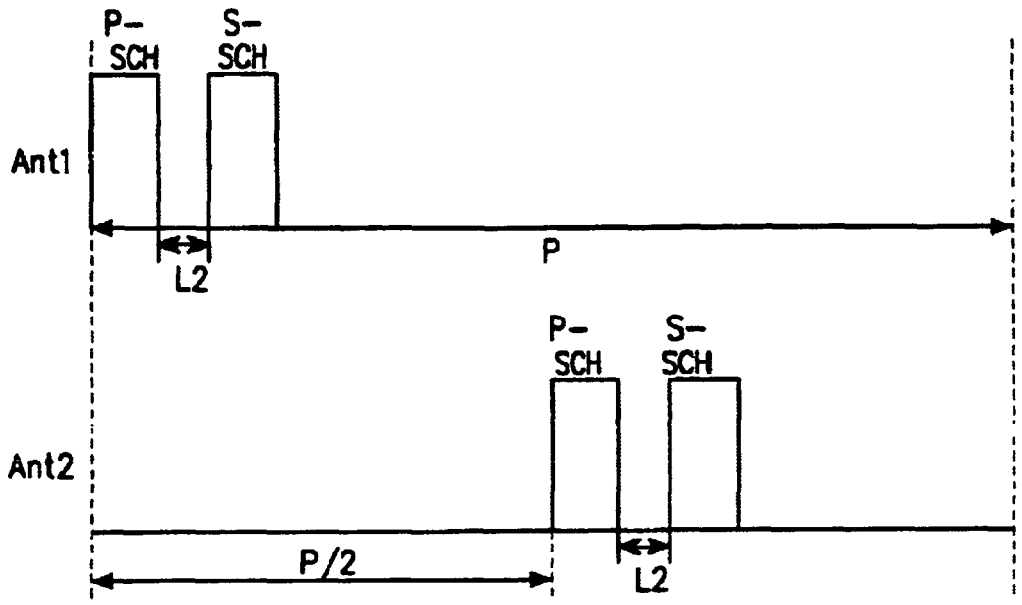
FIG. 8A is a diagram illustrating a sync channel structure according to an embodiment of the present invention in a CDMA communication system supporting antenna diversity.

FIG. 8A shows a case where the sync channels of FIG. 7A are transmitted using two antennas. Referring to FIG. 8A, the primary sync code and the secondary sync code connected thereto are transmitted through the same antenna. This is because when the primary sync code having a high level is detected, it is guaranteed that the secondary sync code also has a high level. In addition, by doing so, it is possible to coherently demodulate the secondary sync code using the primary sync code as a channel estimator. As shown in FIG. 8A, a first antenna Ant1 transmits the primary sync code and the secondary sync code connected thereto, and after a specific time lapse, a second antenna Ant2 transmits the next primary sync code and the secondary sync code connected thereto.

Figure 8B:
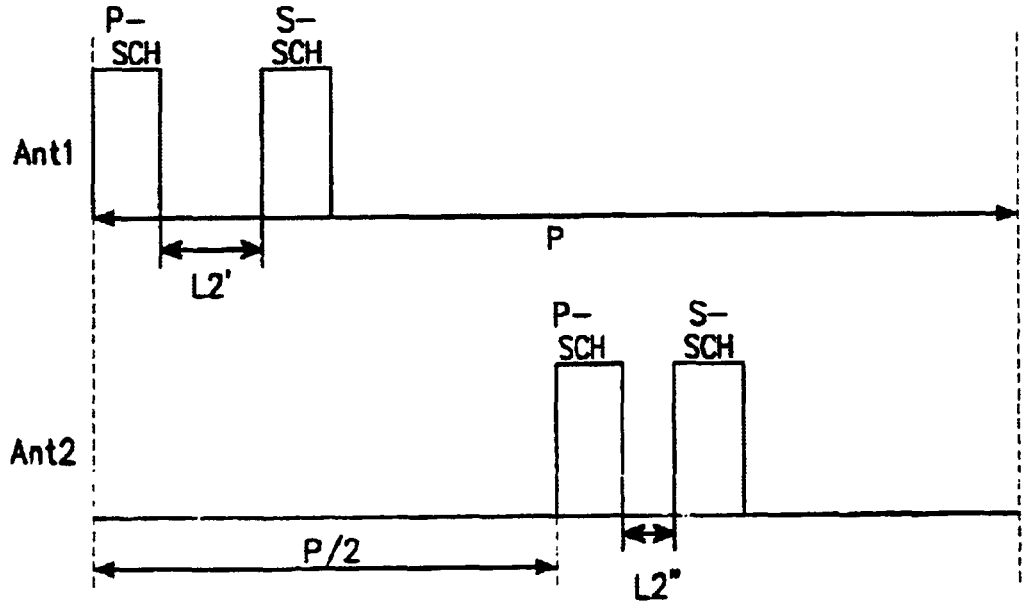
FIG. 8B is a diagram illustrating a sync channel structure according to another embodiment of the present invention in a CDMA communication system supporting antenna diversity.

FIG. 8B shows a case where the sync channels of FIG. 7B are transmitted using two antennas. Similarly to FIG. 8A, the primary sync code and the secondary sync code connected thereto are transmitted through the same antenna. A difference between FIG. 8A and 8B is that the interval between the primary sync code and the secondary sync code transmitted through one antenna is different from the interval between the primary sync code and the secondary sync code transmitted through the other antenna. This is so when the primary sync code having a high level is detected, it is guaranteed that the secondary sync code also has a high level.

Figure 9A:
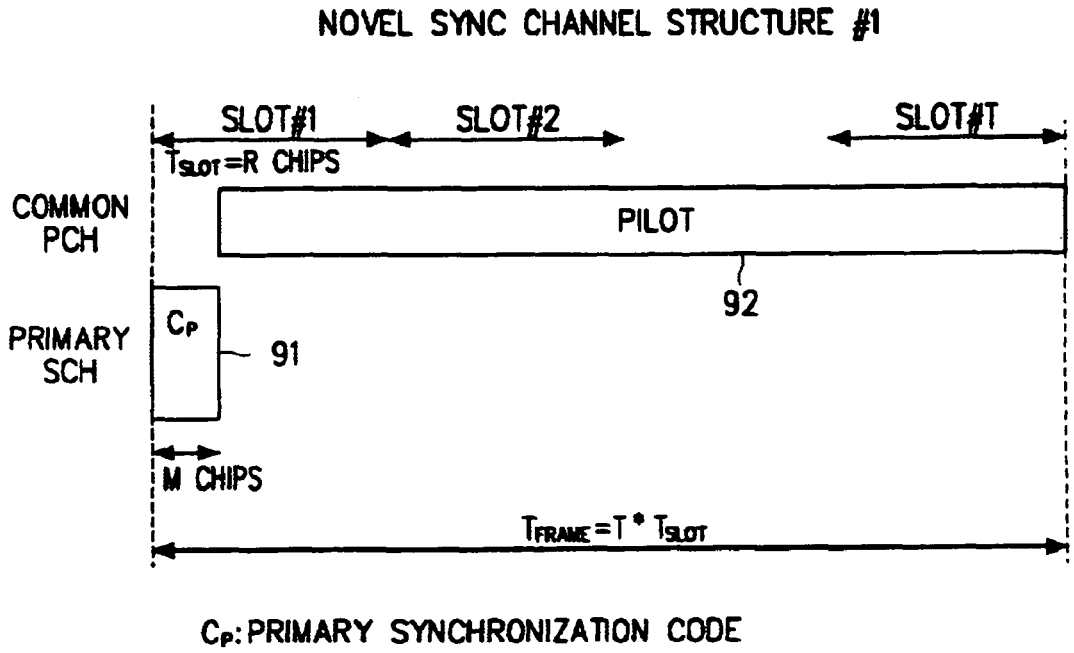
FIG. 9A is a diagram illustrating a structure of a common pilot channel and a sync channel according to an embodiment of the present invention.

FIG. 9A shows structures of a sync channel and a common pilot channel according to an embodiment of the present invention. In FIG. 9A, reference numeral 91 denotes the primary sync code and reference numeral 92 denotes the common pilot code. This embodiment of the present invention relates to operation in an asynchronous system, and in the embodiment of FIG. 9A, the number of different spreading codes used for cell identification is limited to 16. Therefore, it is assumed herein that the secondary sync code used for group identification is not necessary. In addition, a frame starting point can be detected by transmitting the primary sync code once every frame, instead of transmitting the primary sync code once every slot. In this embodiment of the present invention, the primary sync code is transmitted at higher power ($S \geqq 1$) as compared with the primary sync code in the asynchronous mode. That is, in this embodiment of the present invention, transmission power of the sync code is higher than or equal to 1. A starting point of the primary sync code is L chips ($L \geqq 0$) from a starting point of the common pilot channel frame, and the primary sync code is transmitted K times ($K \geqq 1$) by P chips every frame. FIG. 9A shows a case where $L=0$ and $K=1$.

The common pilot channel can use different spreading codes for different base stations, or can apply different PN offsets to the same spreading code. A generation method and a period of the spreading code are the same as the asynchronous mode. However, in the synchronous mode stated above, a spreading code, which is different from the spreading code used in the asynchronous mode, should be used. In FIG. 9A, the common pilot channel is not transmitted in a period where the primary sync code is transmitted.

Figure 9B:
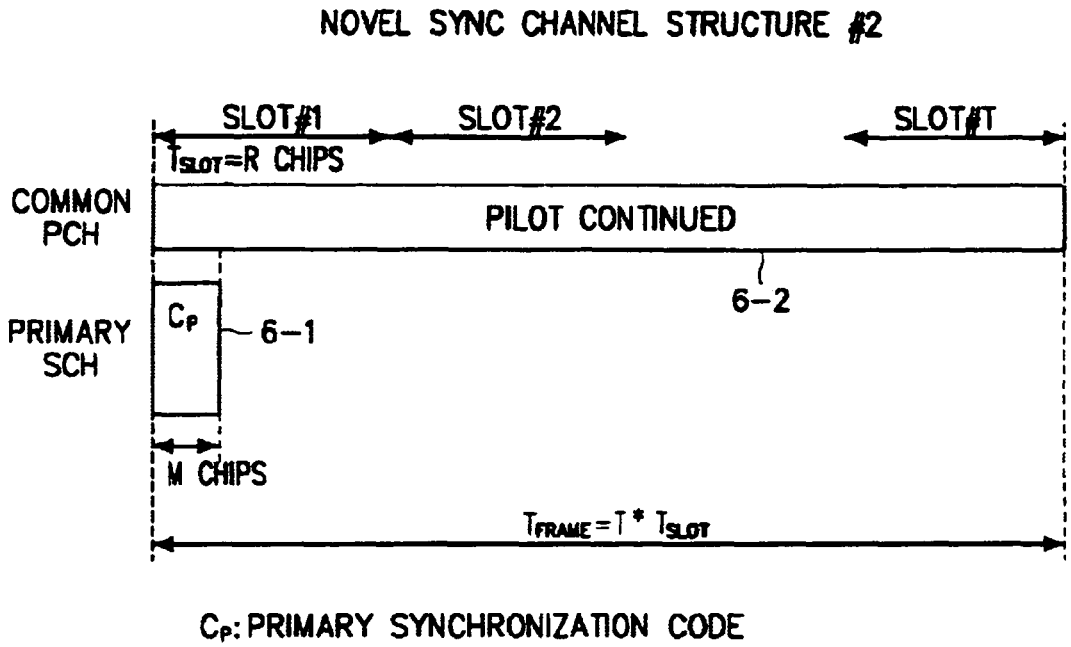
FIG. 9B is a diagram illustrating a structure of a common pilot channel and a sync channel according to another embodiment of the present invention.

FIG. 9B shows a case where the common pilot channel is continuously transmitted even in a period where the primary sync code is transmitted. A description of each reference numeral in FIG. 9B is identical to a description of the corresponding reference numeral in FIG. 9A.

Figure 10A:
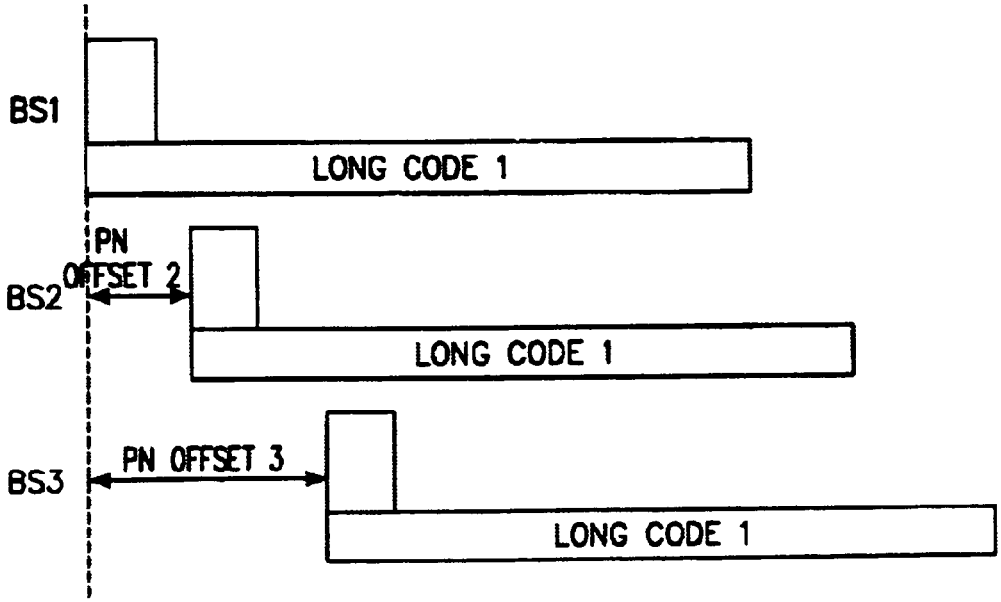
FIG. 10A is a diagram illustrating a case where a sync channel and a pilot channel use different long codes according to an embodiment of the present invention.
Figure 10B:
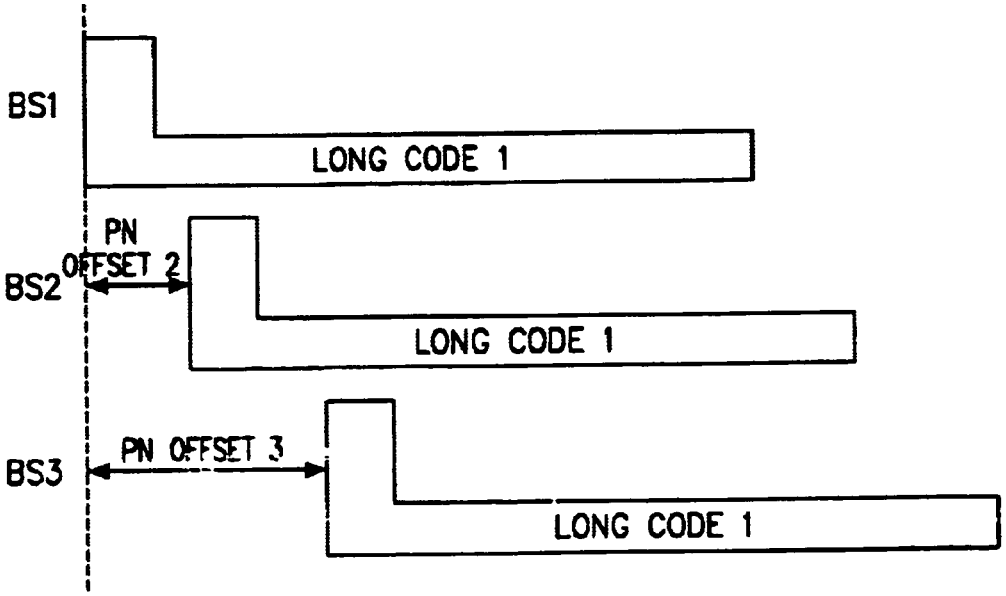
FIG. 10B is a diagram illustrating a case where the sync channel and the pilot channel use the same long code according to an embodiment of the present invention.

FIGS. 10A and 10B show a case where only one PN code is used for a spreading code and base station identification is performed using a PN offset. To show an example where a channel is spread with a PN spreading code, this embodiment of the present invention assumes that the common pilot channel is transmitted by code division multiplexing (CDM). However, it should be noted that the invention can be easily applied regardless of the channel structure. In the proposed method, the secondary sync code is not used, a starting point of the primary sync code is apart by L chips ($L \geqq 0$) from a starting point of one period of the spreading code, and the primary sync code is transmitted K times ($K \geqq 1$) by N chips every period of the PN spreading code. FIGS. 10A and 10B show a case where $K=1$ and $L=0$. The base stations are distinguished with different PN offsets. It is assumed that a base station BS1 has a PN offset of '0', a base station BS2 has a PN offset of '2' and a base station BS3 has a PN offset of '3'. Starting points where the base stations transmit their primary sync codes have a time difference by the PN offsets, so that it is possible to acquire timing information of the spreading code upon acquisition of the primary sync code, regardless of the PN offset values of the base stations. The common pilot channel can be either continuously transmitted or not transmitted at the time where the primary sync code is transmitted. The sync channels of the W-CDMA system are transmitted while maintaining orthogonality with other channels for the forward link. However, in FIG. 10A, the primary sync code can maintain orthogonality with other channel signals. This is possible by XORing the spreading code for the forward link and a Walsh function, for the sync codes.

In the embodiment of FIG. 10B where only one PN code is used for the spreading code for the forward link in the synchronous mode, N chips in the period being part by L chips from the starting point of the PN code for the pilot channel can be used for the primary sync channel. FIG. 10B shows a case where $L=0$. In this case, it can be considered that the primary sync code is transmitted at increased power in the corresponding period of the common pilot channel, and this can be implemented by gain controlling.

Figure 10C:
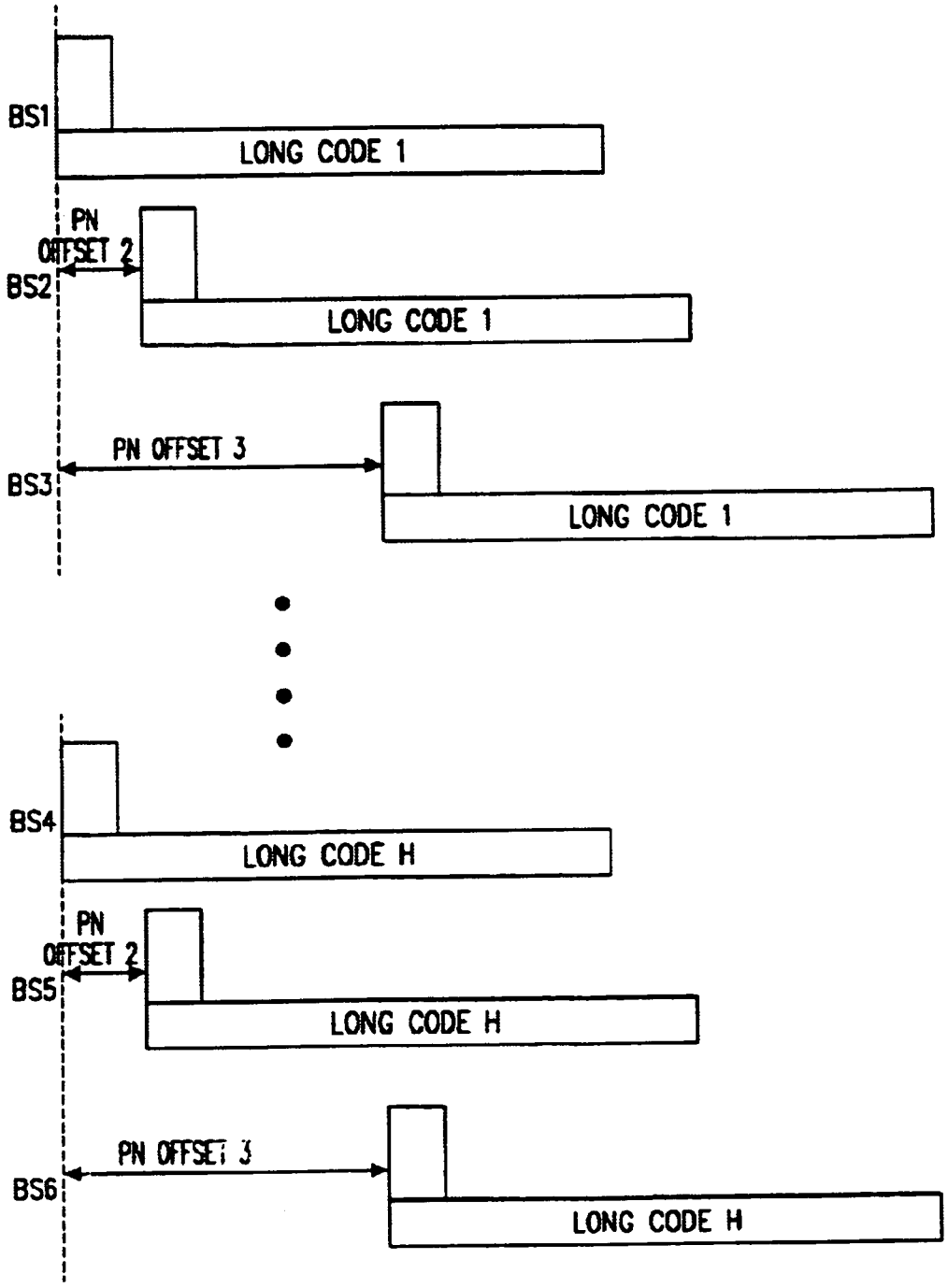
FIG. 10C is a diagram illustrating a case where every base station uses the same long code for the sync channels and different long codes for the pilot channels, and the same long code is used on a group unit basis according to an embodiment of the present invention.

FIG. 10C shows a case where the number of different PN codes used for the spreading code on the forward link is higher than 1. A starting point of the primary sync code is apart by L chips ($L \geqq 0$) from a starting point of one period of the spreading code, and the primary sync code is transmitted once by N chip length every frame. FIG. 10C shows a case where $L=0$. The base stations are identified using different spreading codes or different PN offsets for the same spreading code. In the embodiment of FIG. 10C, it is assumed that the base stations BS1, BS2 and BS3 commonly use the first spreading code and have different PN offsets of PN offset 1, PN offset 2 and PN offset 3, respectively. The PN offset 1 is 0. Further, it is assumed that the base stations BS4, BS5 and BS6 all use the Hth spreading code and have the different PN offsets of PN offset 1, PN offset 2 and PN offset 3, respectively. That is, the PN offset values which can be given for different base stations can be equal to each other because the spreading codes will be different. Starting points where the base stations transmit their the primary sync codes have time differences by the corresponding PN offsets, so that it is possible to acquire timing information of the spreading code upon acquisition of the primary sync code regardless of the PN offset values of the base stations. After acquiring the timing information of the spreading code, despreading is performed on the different spreading codes to detect the used spreading code, thereby finally acquiring synchronization.

In FIG. 10C, when NUM_OFFSET=32 and H (=NUM_PN)=16, i.e., when 16 different PN codes are used and the PN codes are distinguished with 32 different PN offsets, it is possible to simultaneously distinguish 512 cells.

In the case where the system has a transfer rate of 3.84 Mcps and the frame length is 10 ms, if 32 PN offsets are given for one PN code, a unit of the PN offset is 1200 chips.

Figure 11A:
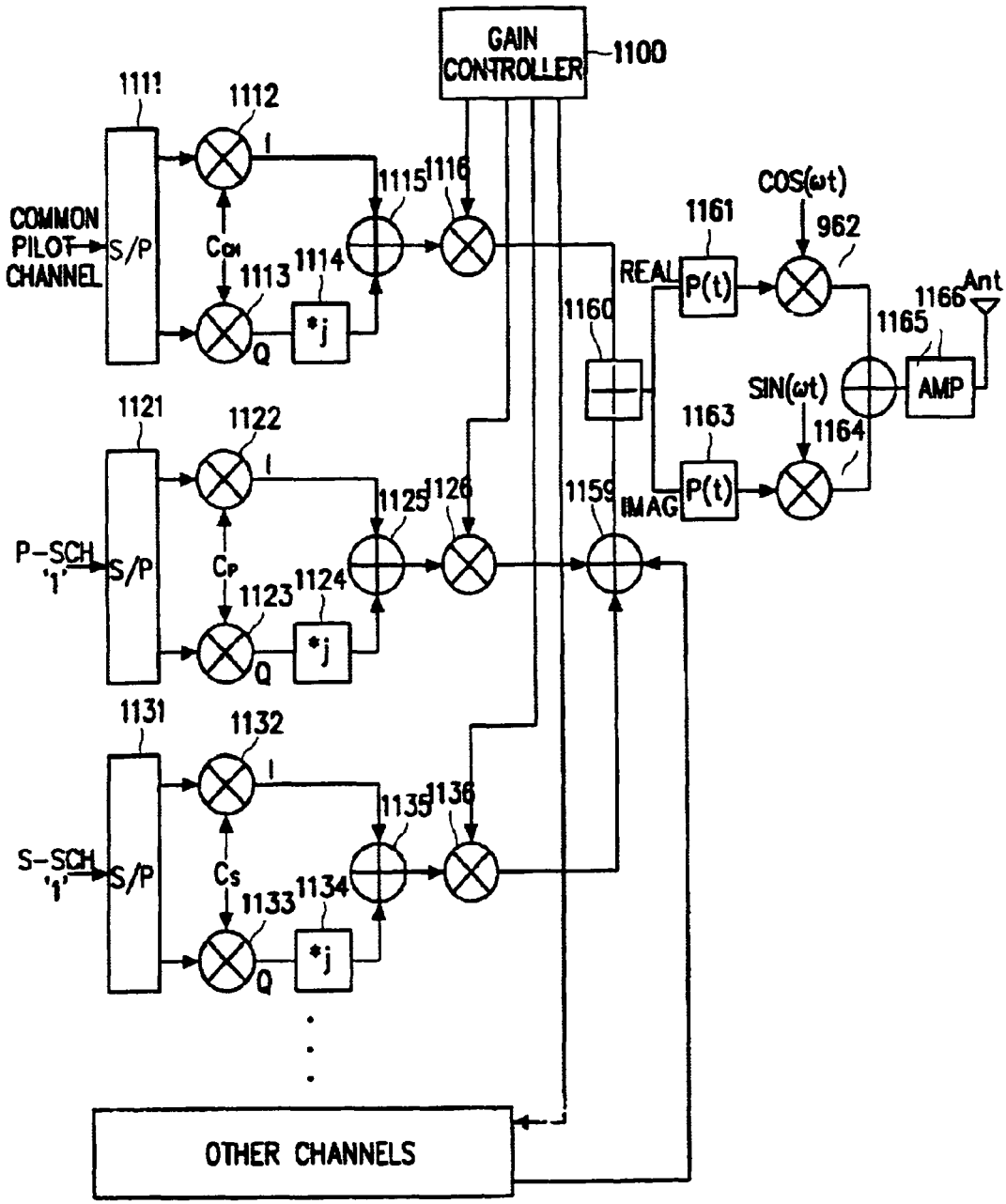
FIG. 11A is a diagram illustrating a structure of a channel transmitter for transmitting sync channel codes according to an embodiment of the present invention.
Figure 11B:
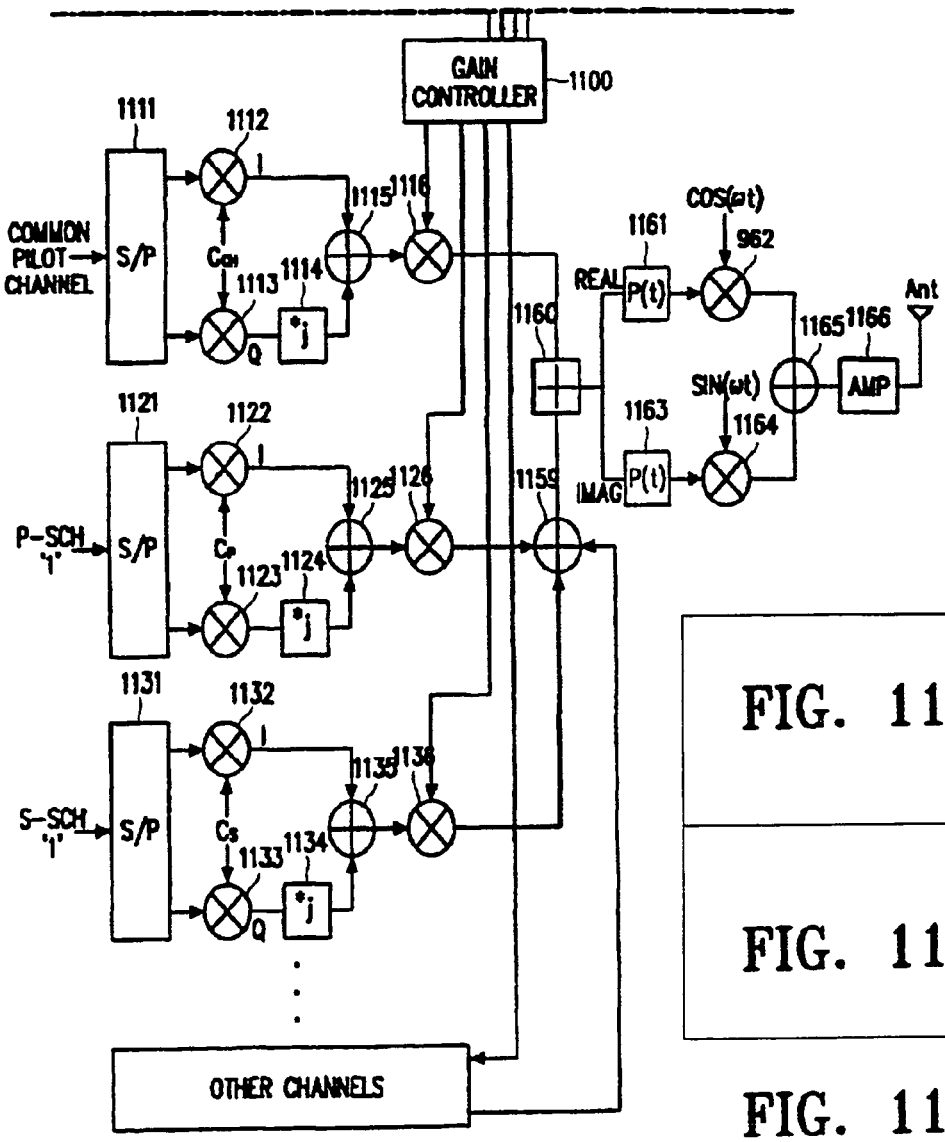
FIG. 11B is a diagram illustrating a structure of a channel transmitter for transmitting sync channel codes in a CDMA communication system supporting antenna diversity according to an embodiment of the present invention.

FIGS. 11A and 11B show channel transmitters of the base station for transmitting the primary and secondary sync codes according to different embodiments of the present invention. More specifically, FIG. 11A shows a channel transmitter for transmitting the sync codes using one antenna, and FIG. 11B shows a channel transmitter for transmitting the sync codes using two antennas in an antenna diversity method. A description will be made of a method for transmitting the sync codes using antenna diversity, with reference to FIG. 11B.

Referring to FIG. 11B, a serial-to-parallel (S/P) converter 1111a parallel-converts a received common pilot channel signal to be transmitted through a first antenna Ant1 into I and Q channel data. Multipliers 1112a and 1113a spread the separated I channel and Q channel common pilot data with a channel spreading code $C_{ch}$, respectively. The channel spreading codes used in FIGS. 11A and 11B can be expressed in complex number. A phase shifter 1114a shifts a phase of the spread Q channel data by 90°. An adder 1115a adds outputs of the multiplier 1112a and the phase shifter 1114a to generate a complex spread signal I+jQ.

Similarly, a serial-to-parallel (S/P) converter 1111b parallel-converts a received common pilot channel signal to be transmitted through a second antenna Ant2 into I and Q channel data Multipliers 1112b and 1113b spread the separated I and Q channel common pilot data with a channel spreading code $C_{ch}$, respectively. A phase shifter 1114b shifts a phase of the spread Q channel data by 90°. An adder 1115b adds outputs of the multiplier 1112b and the phase shifter 1114b to generate a complex spread signal I+jQ.

A serial-to-parallel converter 1121a parallel-converts a received primary sync channel (P-SCH) signal to be transmitted through the first antenna Ant1 into I and Q channel data Multipliers 1122a and 1123a spread the primary sync channel data separated into the I and Q channels with a channel spreading code $C_p$, respectively. A phase shifter 1124a shifts a phase of the spread Q channel data by 90°. An adder 1125a adds outputs of the multiplier 1122a and the phase shifter 1124a to generate a complex spread signal I+jQ. This signal is transmitted to the first antenna Ant1.

Similarly, a serial-to-parallel converter 1121b parallel converts a received primary sync channel (P-SCH) signal to be transmitted through the second antenna Ant2 into I and Q channel data. Multipliers 1122b and 1123b spread the primary sync channel data separated into the I and Q channels with a channel spreading code $C_p$, respectively. A phase shifter 1124b shifts a phase of the spread Q channel data by 90°. An adder 1125b adds outputs of the multiplier 1122b and the phase shifter 1124b to generate a complex spread signal I+jQ. This signal is transmitted to the second antenna Ant2.

A serial-to-parallel converter 1131a parallel-converts a received secondary sync channel (S-SCH) signal to be transmitted through the first antenna Ant1 into I and Q channel data Multipliers 1132a and 1133a spread the secondary sync channel data separated into the I and Q channels with a channel spreading code $C_{Sch}$, respectively. A phase shifter 1134a shifts a phase of the spread Q channel data by 90°. An adder 1135a adds outputs of the multiplier 1132a and the phase shifter 1134a to generate a complex spread signal I+jQ. This signal is transmitted to the first antenna Ant1.

Similarly, a serial-to-parallel converter 1131b parallel-converts a received secondary sync channel (S-SCH) signal to be transmitted through the second antenna Ant2 into I and Q channel data Multipliers 1132b and 1133b spread the secondary sync channel data separated into the I and Q channels with a channel spreading code $C_{sch}$, respectively. A phase shifter 1134b shifts a phase of the spread Q channel data by 90°. An adder 1135b adds outputs of the multiplier 1132b and the phase shifter 1134b to generate a complex spread signal I=jQ. This signal is transmitted to the second antenna Ant2.

The channel transmitter can further include common channels or dedicated channels in addition to the common pilot channel and the primary and secondary sync channels. For such forward channel transmitters, there can be provided the transmitters for forward common channels and forward dedicated channels.

A gain controller 1100 determines whether to gate the channel and controls transmission power of the signals to be transmitted through the first and second antennas Ant1 and Ant2. Adders 1160a adds the gain controlled channel signals output from gain controllers 1116a, 1126a and 1136a, respectively. An adder 1160b adds the gain controlled channel signals output from gain controllers 1116b, 1126b and 1136b, respectively. Baseband filter 1161a and 1163a filter baseband signals out of the signals output from adder 1160a, and baseband filters 1161b and 1163b filter baseband signals out of the signals output from adder 1160b. Multipliers 1162a and 1164a multiply outputs of the associated baseband filters 1161a and 1163a by the corresponding carriers. Multipliers 1162b and 1164b multiply outputs of the associated baseband filters 1161b and 1163b by the corresponding carriers. The outputs of the multipliers 1162a and 1164a are added by an adder 1165a and transmitted to the first antenna Ant1. The outputs of the multipliers 1162b and 1164b are added by an adder 1165b and transmitted to the second antenna Ant2.

The channel transmitter, shown in FIG. 11A, for transmitting the sync channel signals through a single antenna has the same operation as either half of the channel transmitter shown in FIG. 11B.

Figure 12:
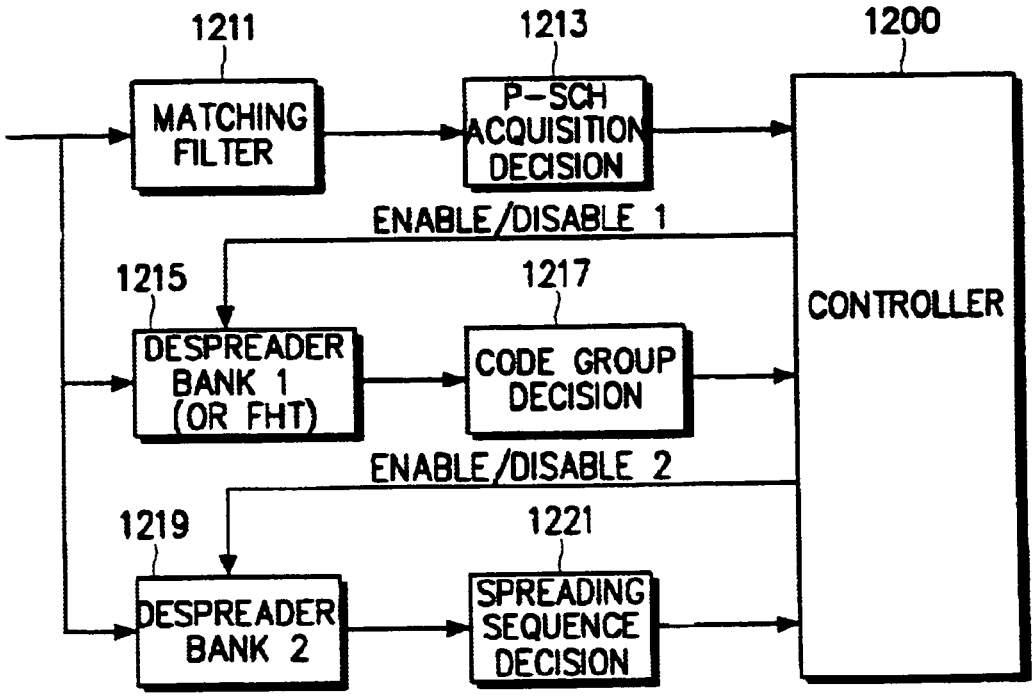
FIG. 12 is a diagram illustrating a receiving device for a mobile station in a CDMA communication system having the sync channel structure according to an embodiment of the present invention.

FIG. 12 shows a receiver for the sync channel structure according to the first and second embodiments shown in FIGS. 4 and 5.

With reference to FIG. 12, operation of the receiver for the mobile station will be described. A matching filter 1211 attempts to acquire the sync channels by match filtering the received sync channel signals. Upon receipt of the output of the matching filter 1211, a primary sync channel acquisition decider 1213 determines whether the primary sync channel is acquired or not. Operation of the primary sync channel acquisition decider 1213 is shown in FIG. 13.

Figure 13:
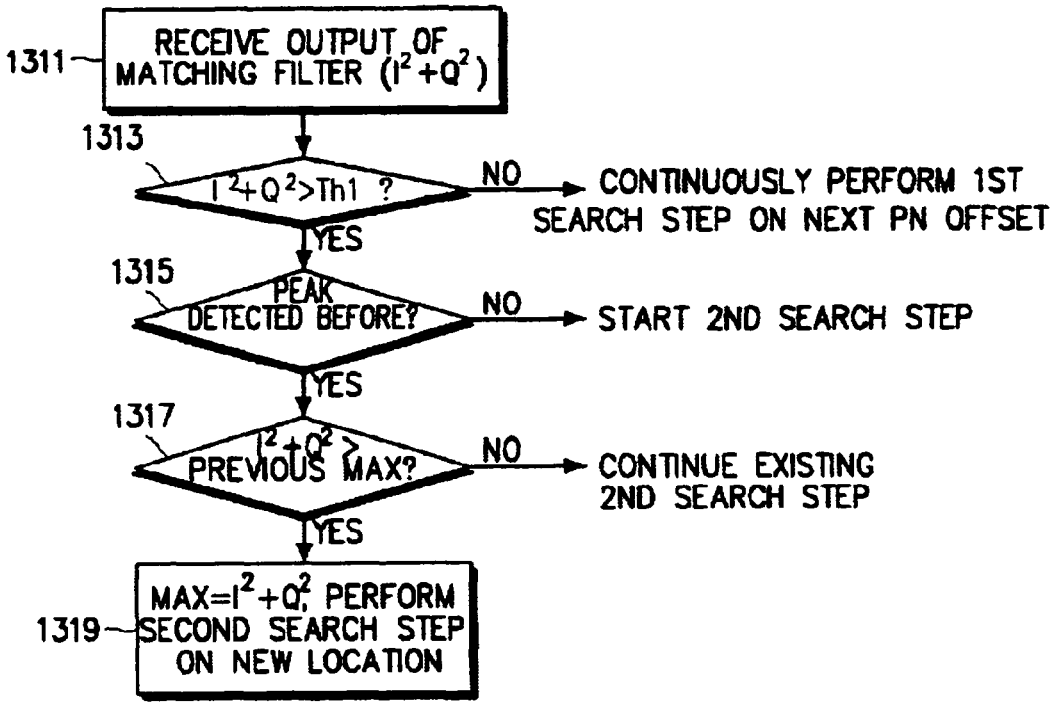
FIG. 13 is a flow chart illustrating an operation performed in the primary sync channel acquisition decider of FIG. 12 according to an embodiment of the present invention.

Referring to FIG. 13, the primary sync channel acquisition decider 1213 receives the output of the matching filter 1211 and calculates $I^2+Q^2$ to calculate energy, in step 1311. Thereafter, in step 1313, the primary sync channel acquisition decider 1213 compares the calculated energy with a threshold value to determine whether synchronization is acquired or not. If the calculated energy value is smaller than or equal to the threshold value TH1, a first search step is continuously performed on the next PN offset. Otherwise, if the energy value is larger than the threshold value TH1 in step 1313, it is determined in step 1315 whether a peak signal is acquired or not. To this end, it is first determined whether the energy value has ever previously exceeded the threshold value. If the energy value has never before exceeded the threshold value, a second search step is started for the PN offset. Otherwise, if the energy value has exceeded the threshold value before, the primary sync channel acquisition decider 1213 compares the previous maximum value with the presently detected energy in step 1317. If the presently detected energy value is higher than the previous maximum value in step 1317, the current second search step is ended and the second search step is performed on the new PN offset in step 1319. Otherwise, when the previous maximum value is higher than the presently detected energy value in step 1317, the existing second search step is continuously performed continuously.

In the embodiments of FIGS. 4 and 5, frame synchronization is acquired after completion of the first search step, so that only information about the group to which the base station belongs should be determined in the second search step.

Upon receipt of the decision results and the frame sync information from the primary sync code acquisition decider 1213, a controller 1200 enables a despreader bank 1215 to perform the second search step based on the acquisition information of the primary sync channel. Here, if an orthogonal code is used for the secondary sync channel code, the despreader bank 1215 used for the second search step can be implemented by fast Hadamard transform (FHT). A code group decider 1217 receiving the output of the despreader bank 1215, determines a code group to which the base station belongs in the second search step. When transmitting the sync channels signal having the structure of FIG. 4, the receiver despreads the secondary sync code after a lapse of a specified time ($L_2$ chips) from an acquisition point of the primary sync code. The receiver includes the despreader bank 1215, which has as many despreaders as the possible code groups. The code group decider 1217 receives the output of the despreader bank 1215 and then determines a code group indicated by a spreading code having the highest detected energy as a code group of the corresponding base station. In addition, when transmitting the sync channels signal having the structure of FIG. 6, the despreader banks 1215 performs despreading on the spreading code available in the corresponding time slot at every time slot beginning at the acquisition starting point of the primary sync channel, and the code group decider 1217 determines the code group indicated by the spreading code having the highest value as the code group of the corresponding base station. Although it is possible to determine the code group by receiving one secondary sync code in the second search step, when the receiving reliability for the secondary sync code is not high enough, the secondary sync code can be repeated until the reliability increases to some extent.

When the information about the code group to which the base station belongs is acquired through the second search step, the controller 1200 enables the despreader bank 1219. The despreader bank 1219 despreads the possible spreading sequences in the code group determined and provides the results to a spreading sequence decider 1221, in the second search step. The spreading sequence decider 1221 then determines which spreading sequence is used for the spreading sequence and also, determines whether sync acquisition is performed successfully. The results are provided to the controller 1200 to finally notify whether sync acquisition is performed successfully.

Figure 14:
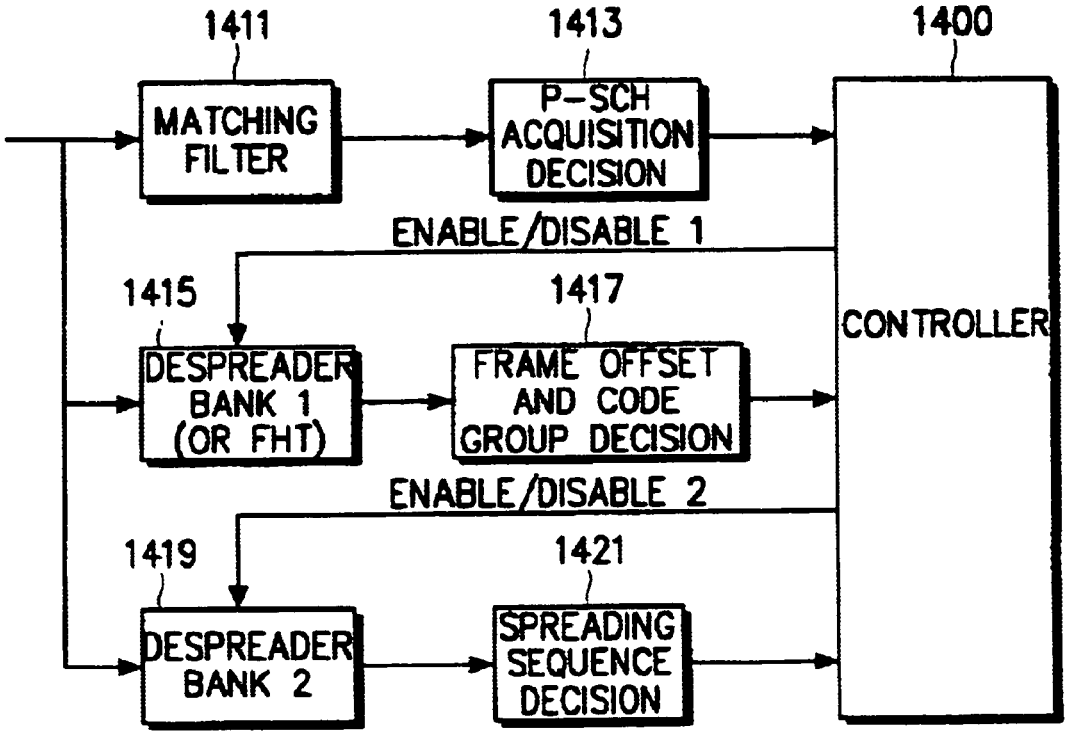
FIG.14 is a diagram illustrating another receiving device for a mobile station in a CDMA communication system having the sync channel structure according to an embodiment of the present invention.

FIG. 14 shows a receiver for the sync channel structure shown in FIGS. 7A and 7B according to an embodiment of the present invention. The same receiver can be applied even to the case where the base station transmits a signal using two or more antennas as shown in FIGS. 8A and 8B.

With reference to FIG. 14, operation of the receiver for the mobile station will be described. A matching filter 1411 match-filters an input signal to attempt acquisition for the primary sync code and provides the results to a primary sync code acquisition decider 1413. The primary sync code acquisition decider 1413 then determines whether the primary sync code is acquired or not. Operation of the primary sync code acquisition decider 1413 is performed according to the procedure shown in FIG. 13.

When the primary sync code acquisition decider 1413 provides the controller 1400 with the primary sync code acquisition decision results by performing the procedure of FIG. 13, the controller 1400 enables a despreader bank 1415 to perform the second search step based on the decision results. At this point, if orthogonal spreading codes are used for the secondary sync code, the despreader bank 1415 used in the second search step can be implemented by fast Hadamard transform (FHT). In the second search step, the receiver acquires the code group to which the base station belongs, and frame synchronization. For the sync channel structure shown in FIG. 7A, the despreader bank 1415 performs despreading on the secondary sync code after a lapse of a specified time $L_2$ from an acquisition point of the primary sync code. Here, for the despreader bank 1415, there are provided as many despreaders as (possible code group number)*(NUM_PRI). A frame offset and code group decider 1417 determines, as code group and frame sync information of the corresponding base station, the code group indicated by the spreading code having the highest detected energy out of the outputs of the despreader bank 1415 and frame boundary information.

In addition, for the sync channel structure shown in FIG. 7B, the despreader bank 1415 performs despreading on the possible spreading codes in the corresponding time slot every time slot beginning at an acquisition starting point of the primary sync code, and the frame offset and code group decider 1417 determines, as code group and frame sync information of the corresponding base station, a code group indicated by a spreading code having the highest value out of the despread values and the frame boundary information. Although it is possible to determine the code group by receiving one secondary sync code in the second search step, when the receiving reliability of the secondary sync code is not high enough, the secondary sync code can be repeatedly transmitted in order to increase the reliability to some extent.

Figure 15:
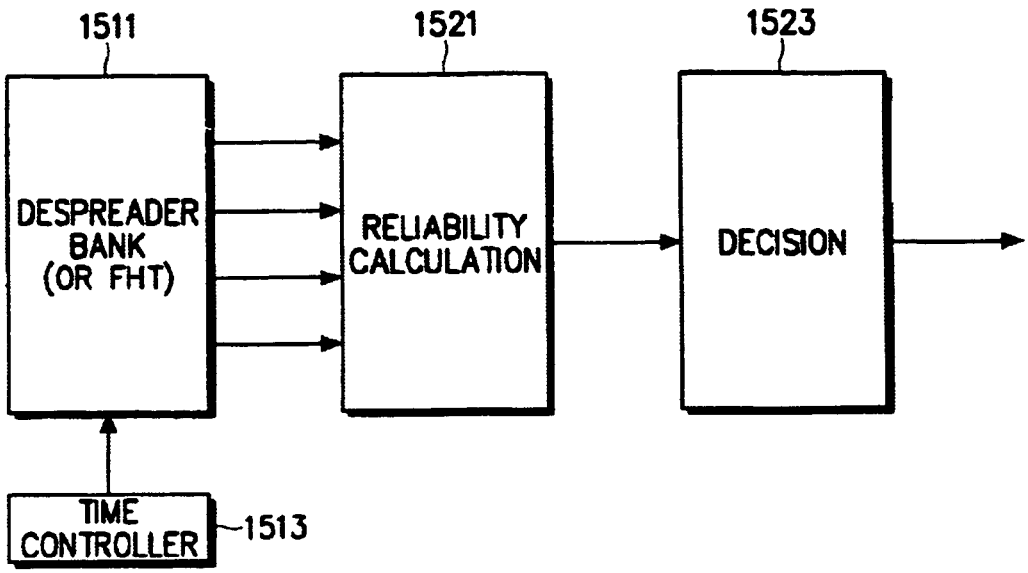
FIG. 15 is a diagram illustrating the despreader and the code group decider of FIG. 14 according to an embodiment of the present invention.
Figure 16:
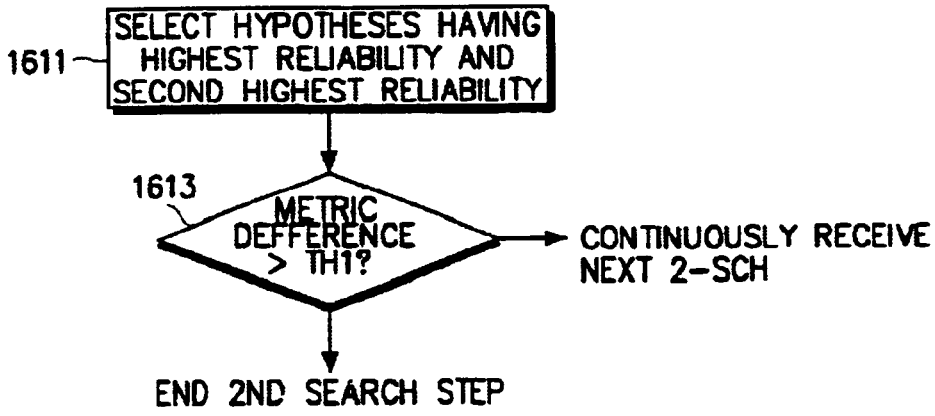
FIG. 16 is a flow chart illustrating an operation performed in the decider of FIG. 15 according to an embodiment of the present invention.

FIG. 15 shows the despreader bank 1415 and the frame offset and code group decider 1417 for performing the second search step, and FIG. 16 shows operation of the frame offset and code group decider 1417.

With reference to FIGS. 15 and 16, operation of the frame offset and code group decider 1417 will be described. The despreader bank 1415 includes a despreader bank (or FHT) 1511 and a time controller 1513 for controlling the despreader bank 1511. The frame offset and code group decider 1417 includes a reliability calculator 1521 and a decider 1523. When the despreader bank 1511 is enabled by the time controller 1513, a spreading code used for the secondary sync code is despread by the despreader bank 1511 and the reliability is calculated for every hypothesis of code group and frame synchronization. When the primary sync code is transmitted only once as shown in FIGS. 4 and 5, the reliability is calculated every code group hypothesis. One of the easy methods for calculating the reliability is to use an energy value ($I^2+Q^2$) of the despread results. The reliability for each hypothesis is provided to a decider 1523, which decides the reliability.

FIG. 16 shows operation of the decider 1523. Referring to FIG. 16, the decider 1523 orderly arranges the reliabilities for every hypotheses in step 1611 to determine a hypothesis having the highest reliability and a hypothesis having the second highest reliability. Thereafter, in step 1613, the decider 1523 calculates a metric difference between the hypothesis having the highest reliability and the hypothesis having the second highest reliability, to determine whether synchronization of the second search step is performed or not. When the difference between the two values is lower than or equal to a threshold value, the decider 1523 continuously receives the next secondary sync code, considering that the reliability of the second search step is not high enough. Otherwise, when the metric difference is higher than the threshold value in step 1613, the decider 1523 makes a decision on the code group and frame synchronization, because the reliability of the second search step is high enough. Upon receipt of the code group decision results, the controller 1400 performs a third search step to finally detect the spreading code used by the base station.

After acquiring the code group, to which the base station belongs, and frame synchronization by performing the second search step, the controller 1400 enables a despreader bank 1419. The despreader bank 1419 then performs despreading on the possible spreading sequences in the code group decided in the second search step, and the results are provided to a spreading sequence decider 1421. The spreading sequence decider 1421 then determines which spreading sequence out of the outputs of the despreader bank 1419 is used for the spreading code and also determines whether sync acquisition is performed successfully. The results are provided to the controller 1400 to finally notify whether sync acquisition is performed successfully.

In addition, the present invention provides a method for acquiring frame synchronization by transmitting one sync channel. The invention is more effective especially when the base stations operate in sync with a global positioning system (GPS). However, in the CDMA system, the base stations can operate in either in a synchronous mode or an asynchronous mode. The present invention provides a method for distinguishing a base station system operating in sync with the GPS from a base station system operating out of sync with the GPS. That is, the invention distinguishes the synchronous system from the asynchronous system by using different sync sequences for the sync channels in the synchronous mode and the asynchronous mode. The reason for using the different sync sequences in the synchronous mode and the asynchronous mode is to enable the mobile station to rapidly determine to which system (synchronous system or asynchronous system) the mobile station itself belongs and to use different sync channels in the synchronous mode and the asynchronous mode.

Figure 17A:
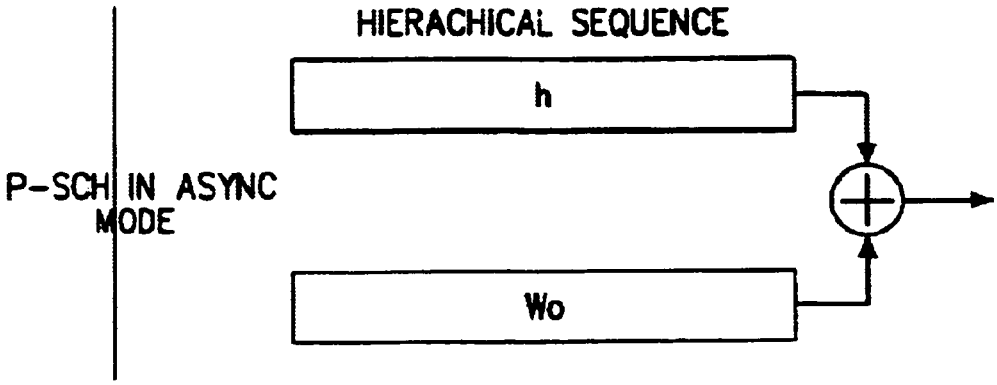
FIG. 17A is a diagram illustrating a scheme for generating a sync code for an asynchronous primary sync channel in a CDMA communication system according to an embodiment of the present invention.

FIG. 17A shows a method for generating a sync sequence used for a primary sync channel in an asynchronous W-CDMA system. The sync sequence is generated by XORing a hierarchical sequence H and a Walsh function $W_o$ on a chip unit basis.

Figure 17B:
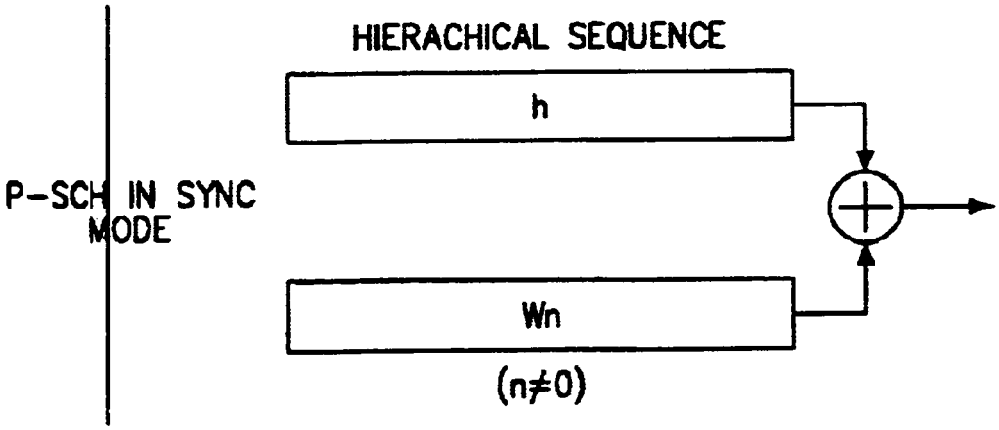
FIG. 17B is a diagram illustrating a scheme for generating a sync code for a synchronous primary sync channel in a CDMA communication system according to an embodiment of the present invention.

FIG. 17B shows a scheme for generating a sync sequence for the sync channel proposed in this embodiment of the present invention, wherein the syn sequence of the sync channel for the synchronous system is designed to be orthogonal with a sync sequence of the sync channel for the asynchronous system. This is to minimize a correlation value between the sync sequences used in the different systems. The sync sequence for the sync channel in the embodiment shown in FIG. 17B is generated by XORing the hierarchical sequence H used in the asynchronous mode and the Walsh function $W_n$ on a chip unit basis. The Walsh function $W_n$ is selected from the Walsh functions which are not used in the asynchronous mode.

When the base station system operates in the synchronous mode, the base stations can be identified using different spreading codes or the PN offsets of the spreading code. The number of the PN spreading codes used for the forward link can be 1 or more. When the number of the PN code is one and the number of the PN offsets given for the PN code is NUM_OFFSET1, it is possible to distinguish NUM_OFFSET1 different cells. When one PN code is used, to have the number of distinguishable cells become equal as compared with a case where NUM_PN PN codes are used, it is necessary to increase the period of the one PN spreading code used as compared with a case where several PN codes are used.

Therefore, when one PN code is used, it is necessary to use a PN code of a longer period or a PN offset of a shorter length as compared with the case where NUM_PN PN codes are used. The present invention will be described with reference to an embodiment wherein 16 different spreading codes are used in the synchronous mode and 32 different PN offsets are applied to each spreading code so as to make it possible to distinguish 512 base stations. The reason for combining several spreading codes and PN offsets unlike the IS-95 system is to apply the invention not only to a case where the base stations are exactly time synchronized to each other using the GPS, but also to a case where the base stations are roughly time synchronized using the system network. That is, when the base stations acquire time synchronization using the network, it is difficult to acquire an exact time synchronization as in the case where the GPS is used. However, in the IS-95 system, since a unit PN offset is about 50 μsec, it is difficult to acquire such synchronization using network synchronization. Therefore, in order to increase an interval between the offsets, it is necessary either to increase the length of the spreading code or to use an increased number of spreading codes.

When a cell operating in the synchronous mode is adjacent to a cell operating in the asynchronous mode and the two cells use the same PN code, there may not be guaranteed a PN offset required for distinguishing a PN code for the cell operating in the synchronous mode from a PN code for the cell operating in the asynchronous mode. Therefore, the PN codes used in the synchronous mode should be different from the PN codes used in the asynchronous mode. A PN spreading code used in the synchronous mode base station should be different from a PN spreading code used in the asynchronous mode base station. To this end, an embodiment of the present invention uses new PN spreading codes which are different in number from the 512 PN spreading codes used in the asynchronous mode. In this embodiment of the present invention, 16 new PN spreading codes are assigned for the synchronous mode base stations.

Figure 18:
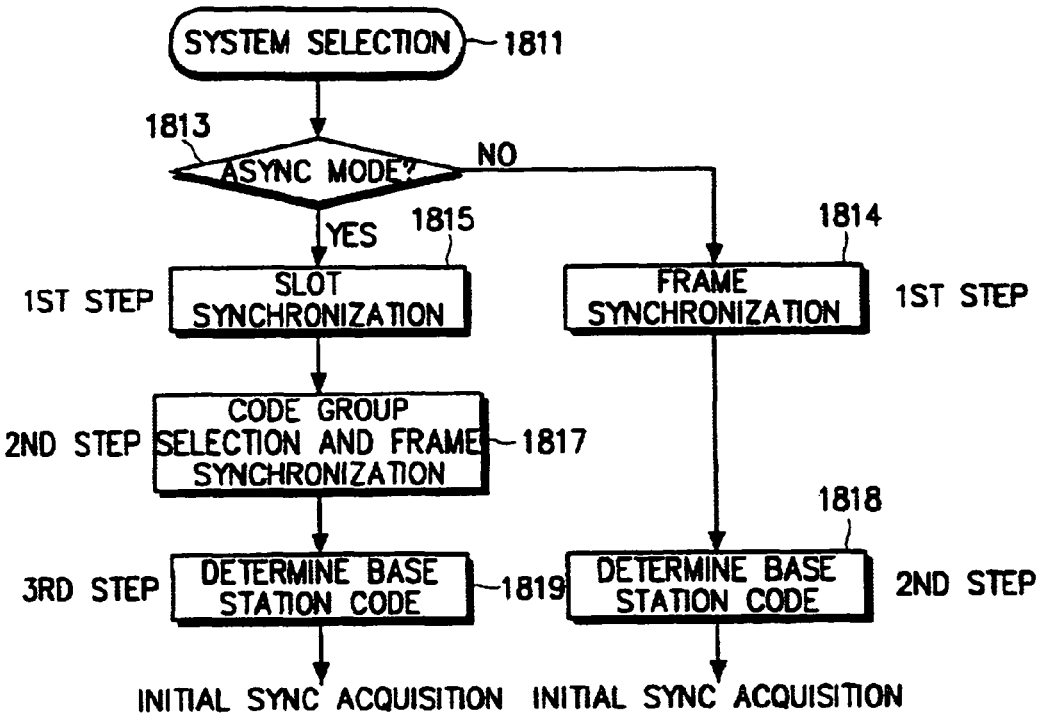
FIG. 18 is a flow chart illustrating a procedure for determining, in a mobile station, a base station code by analyzing sync codes transmitted from an asynchronous or synchronous system according to an embodiment of the present invention.

FIG. 18 shows operation of a mobile station in the case where a base station may operate in either the synchronous mode or asynchronous mode. In the embodiment of FIG. 18, the mobile station should first determine in which mode the base station, to which it belongs, operates. First, in step 1813, the mobile station determines whether acquisition is performed for the synchronous mode or asynchronous mode in a system selection step. When it is determined that the mobile station acquires the asynchronous mode, the mobile station performs the conventional three-step initial cell search process. In this process, the mobile station searches for slot synchronization in a first step (1815); performs code group selection and frame synchronization in a second step (1817); and selects a base station code from the code group in a third step (1819). On the contrary, when acquisition for the synchronous mode is selected, the mobile station searches frame synchronization in a first step (1814), and determines a base station code in a second step (1818).

Figure 19A:
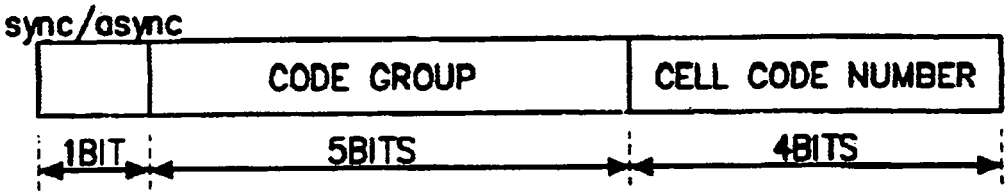
FIGS. 19A to 19C are diagrams illustrating information field structures for performing neighbor cell search in a CDMA communication system according to an embodiment of the present invention.
Figure 19B:
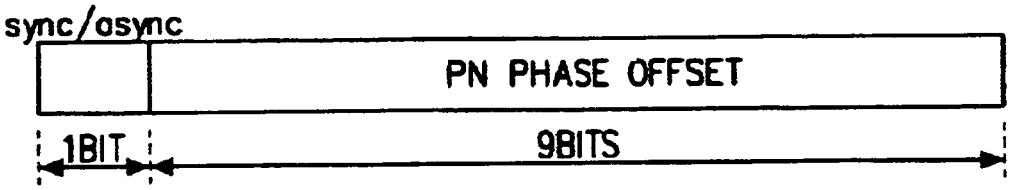
Figure 19C:
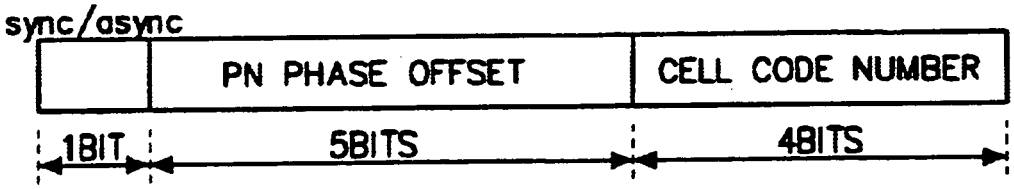

The network transmits neighbor cell list information to the mobile station through a broadcasting channel (BCH) or a forward common channel during handoff, idle mode search or active mode search. FIGS. 19A to 19C show a 10-bit data field for expressing the neighbor cell list. When the base station operates in the synchronous mode or asynchronous mode, information represented by each bit of the data field can be defined differently.

FIG. 19A shows a data field format of the neighbor cell list for a system operating in the asynchronous mode. Since the system operating in the asynchronous mode uses 512 different base station codes, the neighbor cell list field can be defined as follows. A 1st bit indicates whether the system operates in the synchronous mode or asynchronous mode. 2nd to 6th bits indicate which code group is used out of the 32 code groups. 7th to 10th bits indicate which code is used out of the 16 base station codes in each code group.

FIG. 19B shows a data field format of the neighbor cell list for the synchronous mode where the cells are identified using one spreading code and several PN offsets. A 1st bit indicates whether the system operates in the synchronous mode or asynchronous mode. 2nd to 10th bits indicate which PN offset is used out of 512 PN offsets of the single spreading code.

FIG. 19C shows a data field format of the neighbor cell list for the synchronous mode where the cells are identified using several spreading codes and PN offsets. A 1st bit indicates whether the system operates in the synchronous mode or asynchronous mode. 2nd to 6th bits indicate which PN offset is used out of 32 PN offsets for each spreading code. 7th to 10th bits indicate which code is used out of 16 base station codes belonging to the synchronous mode. If the number of the used base station codes and the number of the PN offsets for each code are changed, the length of the corresponding fields may be changed.

In the synchronous mode or operation, whether to operate as shown in FIG. 19B or 19C is previously determined between the base station and the mobile station.

As described above, the novel CDMA communication system can effectively perform transmission of the sync channels and sync acquisition within one period of the spreading code. Further, the asynchronous W-CDMA communication system can perform communication in a synchronous mode using a single sync channel. Therefore, the novel synchronization method can minimize interference on a forward link by reducing the frequency of sync channel transmissions, thereby increasing the system capacity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

[1. A synchronization (sync) code transmission device for a base station in a CDMA (Code Division Multiple Access) communication system, comprising:

a primary sync code transmitter for generating a primary sync code, said primary sync code indicating a starting point of one frame, said frame being equal to one period of a spreading code, and for transmitting the primary sync code at a first location in the frame; and a secondary sync code transmitter for generating a secondary sync code assigned to a group of base stations including the base station, and for transmitting the secondary sync code at a second location in the frame.]

[2. The sync code transmission device as claimed in claim 1, wherein the primary sync code is a common code used by every base station and the secondary sync code is a code for identifying the group of the base stations.]

[3. The sync code transmission device as claimed in claim 2, further comprising a forward common channel signal transmitter for transmitting a spreading code which is specific to a base station and is used for indicating a base station.]

[4. The sync code transmission device as claimed in claim 3, wherein the forward common channel signal transmitter is a pilot channel signal transmitter.]

[5. The sync code transmission device as claimed in claim 3, wherein the forward common channel signal transmitter is a broadcasting channel signal transmitter.]

[6. The sync code transmission device as claimed in claim 2, wherein the primary sync code and the secondary sync code are transmitted at least once within one period of the spreading code.]

[7. The sync code transmission device as claimed in claim 1, wherein the first location is a starting point of one frame.]

[8. The sync code transmission device as claimed in claim 1, wherein the first location is an ending point of one frame.]

[9. The sync code transmission device as claimed in claim 1, wherein the first location is a location separated from a starting point of one frame by a predetermined chip length.]

[10. The sync code transmission device as claimed in claim 1, wherein a time interval between the first location and the second location is such that a demodulator in a mobile station can perform coherent demodulation.]

[11. The sync code transmission device as claimed in claim 1, wherein the secondary sync code is information for indicating a code group to which the base station belongs.]

[12. A synchronization (sync) code transmission device for a base station in a CDMA (Code Division Multiple Access) communication system, comprising:

a primary sync code transmitter for generating a primary sync code, said primary sync code for indicating a starting point of a frame, said frame being equal to one period of a spreading code, and for transmitting at least one said primary sync code at a specific location in the frame; and a secondary sync code transmitter for generating a secondary sync code assigned to a group to which the base station belongs, and for transmitting the secondary sync code at a time slot alter transmission of the primary sync code, said time slot being assigned to at least one base station group, said frame having at least two time slots.]

[13. The sync channel signal transmission device as claimed in claim 12, wherein each of the at least two time slots in said frame are assigned to a plurality of base station group and the secondary sync codes are codes for indicating a base station group out of the plurality of base station groups assigned to a specific time slot.]

[14. The sync code transmission device as claimed in claim 13, wherein secondary sync codes assigned to a time slot are orthogonal to each other.]

[15. The sync code transmission device as claimed in claim 13, wherein a guard interval between time slots has a specific chip size.]

[16. A synchronization (sync) code transmission device for a base station in a CDMA (Code Division Multiple Access) communication system, comprising:

a primary sync code transmitter for generating a primary sync code, said primary sync code for indicating a starting point of a frame, said frame having one period of a spreading code, and for transmitting the primary sync code at a first and third locations in the frame;

a secondary sync code transmitter for generating a secondary sync code, said secondary sync code assigned to a group of base stations, said group including the base station, and for transmitting the secondary sync code at a second and fourth locations in the frame; and an antenna diversity system having at least two antennas comprising:

a first antenna for transmitting the primary and secondary sync codes at the first and third locations; and a second antenna transmitting the primary and secondary sync codes at the second and fourth location.]

[17. The sync code transmission device as claimed in claim 16, wherein the primary sync code is a common code used by every base station, and the secondary sync code is a code for identifying a group of base stations.]

[18. The sync code transmission device as claimed in claim 16, wherein the first location and the third location are located a ½ frame period apart.]

[19. The sync code transmission device as claimed in claim 16, wherein the first location is a starting point of the frame.]

[20. A synchronization (sync) code transmission method for a base station in a CDMA (Code Division Multiple Access) communication system, comprising the steps of:

generating a primary sync code, said primary sync code for indicating a starting point of a frame, said frame having one period of a spreading code;

transmitting the primary sync code at a first location in the frame;

generating a secondary sync code, said secondary code assigned to a group of base stations including the base station; and transmitting the secondary sync code at a second location in the frame.]

[21. A synchronization (sync) code transmission method for a base station in a CDMA (Code Division Multiple Access) communication system wherein a frame has at least two time slots and each time slot is assigned to a plurality of base stations, the method comprising the steps of:

generating a primary sync code, said primary sync code for indicating synchronization at a starting point of a frame, said frame having one period of a spreading code;

transmitting at least one said primary sync code at a specific location in the frame;

generating a secondary sync code, said secondary sync code assigned to a group to which the base station belongs; and transmitting the secondary sync code at a time slot assigned to the corresponding base station group after transmission of the primary sync code.]

[22. A synchronization (sync) code transmission method for a base station in a CDMA (Code Division Multiple Access) communication system supporting a transmit diversity function, said communication system having at least two antennas, a sync code generator for generating a primary sync code, said primary sync code for indicating synchronization at a starting point of a frame, said frame having one period of a spreading code, said sync code generator also for generating a secondary sync code, said secondary sync code assigned to a group of base stations including the base station, the method comprising the steps of:

transmitting the primary sync code at a first location of the frame through a first antenna;

transmitting the secondary sync code at a second location of the frame through a first antenna;

transmitting the primary sync code at a third location of the frame through a second antenna; and transmitting the secondary sync code at a fourth location of the frame through a second antenna.]

[23. A synchronization (sync) code receiving device for a mobile station in a CDMA (Code Division Multiple Access) communication system, comprising:

a primary sync code acquisition decider for acquiring a primary sync code received at a first location in a frame, and for acquiring synchronization at a starting point of a frame, said frame equal to one period of a spreading code; and a base station group decider for, once enabled upon acquisition of the primary sync code, receiving a secondary sync code transmitted at a second location in the frame, and for deciding a base station group to which the transmitting base station belongs.]

[24. A synchronization (sync) code receiving device for a mobile station in a CDMA (Code Division Multiple Access) communication system wherein a frame has at least two time slots, and each of said at least two time slots is assigned to a plurality of base station groups, the device comprising:

a primary sync code acquisition decider for acquiring a primary sync code received at a first location in a frame, and for acquiring synchronization at a starting point of a frame, said frame being equal to one period of a spreading code; and a base station group decider for, once enabled upon acquisition of the primary sync code, performing despreading with secondary sync codes, said secondary sync codes being of the assigned base station groups at each time slot, and for deciding which base station group corresponds to a secondary sync code having a highest value out of the despread signals.]

[25. A synchronization (sync) code receiving device for a mobile station in a CDMA (Code Division Multiple Access) communication system, said system having at least one base station, at least one base station having at least two antennas to support a transmit diversity function, the device comprising:

a primary sync code acquisition decider for acquiring a primary sync code received at first and third locations in a frame, and for acquiring synchronization at a starting point of a frame, said frame being equal to one period of a spreading code; and a base station group decider for, once being enabled upon acquisition of the primary sync code, performing despreading with secondary sync codes at second and fourth locations in the frame, each of said secondary sync codes corresponding to a base station group, and for deciding which base station group corresponds to a secondary sync code having a highest value out of the despread signals.]

[26. A synchronization (sync) code receiving method for a mobile station in a CDMA (Code Division Multiple Access) communication system, comprising the steps of:

receiving a primary sync code transmitted at a first location in a frame;

acquiring synchronization at a starting point of a frame, said frame being equal to one period of a spreading code;

receiving a secondary sync code transmitted at a second location in the frame; and deciding a base station group to which a transmitting base station belongs.]

[27. A synchronization (sync) code receiving method for a mobile station in a CDMA (Code Division Multiple Access) communication system, said system using transmission frames, a frame having at least two time slots, and each time slot being assigned to a plurality of base station groups, the method comprising the steps of:

receiving a primary sync code at a first location in a frame;

acquiring synchronization at a starting point of a frame, said frame having one period of a spreading code;

performing despreading with secondary sync codes, each of said secondary sync codes being assigned to a base station group and a time slot; and deciding a base station group corresponding to a secondary sync code having a highest value out of the despread signals.]

[28. A synchronization (sync) code communication device in a CDMA (Code Division Multiple Access) communication system, comprising:

a base station comprising:

a primary sync code transmitter for generating a primary sync code, said primary sync code for acquiring synchronization at a starting point of a frame, said frame being equal to one period of a spreading code, and for transmitting the primary sync code at a first location in the frame;

a secondary sync code transmitter for generating a secondary sync code, said secondary sync code being assigned to a group of base stations including the base station, and for transmitting the secondary sync code at a second location in the frame;

a mobile station comprising:

a primary sync code acquisition decider for acquiring a primary sync code received at a first location in a frame, and for acquiring synchronization at a starting point of a frame, said frame being equal to one period of a spreading code; and a base station group decider for, once being enabled upon acquisition of the primary sync code, receiving a secondary sync code transmitted at a second location in the frame, and for deciding a base station group to which the corresponding base station belongs.]

[29. A synchronization (sync) code communication device in a CDMA (Code Division Multiple Access) communication system, comprising:

a base station comprising:

a primary sync code transmitter for generating a primary sync code, said primary sync code for acquiring synchronization at a starting point of a frame, said frame being equal to one period of a spreading code, and for transmitting said primary sync code at least one specific location in the frame;

a secondary sync code transmitter for generating a secondary sync code, said secondary sync code being assigned to a base station group to which the base station belongs, and for transmitting the secondary sync code at a time slot after transmission of the primary sync code, said time slot assigned to the base station group, said frame having at least two time slots;

a mobile station including;

a primary sync code acquisition decider for acquiring a primary sync code received at a first location in a frame, and for acquiring synchronization at a starting point of a frame, said frame being equal to one period of a spreading code; and a base station group decider for, once being enabled upon acquisition of the primary sync code, performing despreading with secondary sync codes of assigned base station groups at each time slot, and for deciding a base station group corresponding to a secondary sync code having a highest value out of the despread signals.]

*30. A synchronization (sync) signal transmission method in a communication system, the method comprising:*

*transmitting, by a primary sync signal transmitter, a primary sync signal at every transmission interval; and*

*transmitting, by a secondary sync signal transmitter, a secondary sync signal at every transmission interval,*

*wherein the transmission interval (P) is at P=1 and at P=T/2+1, where T is a total number of slots in a frame and T>2,*

*the primary sync signal transmitted at P=1 is in a first location of the frame, and the primary sync signal transmitted at P=T/2+1 is in a second location of the frame, and*

*the second sync signal transmitted at P=1 is in a third location of the frame, and the second sync signal transmitted at P=T/2+1 is in a fourth location of the frame, the third and fourth locations being different from the first and second locations in the frame, and*

*wherein the first location at P=1 is offset by a predetermined time from a starting point of the frame, and the second location at P=T/2+1 is offset by the predetermined time from a half point of a total length of the frame.*

*31. The sync signal transmission method as claimed in claim 30, wherein the third location at P=1 is offset by a predetermined time from the starting point of the frame, and the fourth location at P=T/2+1 is offset by a predetermined time from the half point of the total frame length.*

*32. The sync signal transmission method as claimed in claim 30, wherein the primary and secondary sync signals comprise one symbol in time domain.*

*33. The sync signal transmission method as claimed in claim 30, wherein the secondary sync signals are generated according to transmission duration information.*

*34. The sync signal transmission method as claimed in claim 30, wherein the primary and secondary sync signals are transmitted on consecutive symbols in time domain.*

*35. The sync signal transmission method as claimed in claim 30, wherein the secondary sync signals at the third and fourth locations uniquely specify a cell group or frame sync.*

*36. A synchronization (sync) signal receiving method in a communication system, the method comprising:*

*receiving, by a primary sync signal receiver, a primary sync signal at every transmission interval; and*

*receiving, by a secondary sync signal receiver, a secondary sync signal at every transmission interval,*

*wherein the transmission interval (P) is at P=1 and at P=T/2+1, where T is a total number of slots in a frame and T>2,*

*the primary sync signal transmitted at P=1 is in a first location of the frame, and the primary sync signal transmitted at P=T/2+1 is in a second location of the frame, and*

*the second sync signal transmitted at P=1 is in a third location of the frame, and the second sync signal transmitted at P=T/2+1 is in a fourth location of the frame, the third and fourth locations being different from the first and second locations in the frame, and*

*wherein the first location at P=1 is offset by a predetermined time from a starting point of the frame, and the second location at P=T/2+1 is offset by the predetermined time from a half point of a total length of the frame.*

*37. The sync signal receiving method as claimed in claim 36, wherein the third location at P=1 is offset by a predetermined time from the starting point of the frame, and the fourth location at P=T/2+1 is offset by a predetermined time from the half point of the total frame length.*

*38. The sync signal receiving method as claimed in claim 36, wherein the primary and secondary sync signals comprise one symbol in time domain.*

*39. The sync signal receiving method as claimed in claim 36, wherein the secondary sync signals are generated according to transmission duration information.*

*40. The sync signal receiving method as claimed in claim 36, wherein the primary and secondary sync signals are received on consecutive symbols in time domain.*

*41. The sync signal receiving method as claimed in claim 36, wherein the secondary sync signals at the third and fourth locations uniquely specify a cell group or frame sync.*

*42. A synchronization (sync) signal transmission apparatus in a communication system, the apparatus comprising:*

*a primary sync signal transmitter for transmitting a primary sync signal at every transmission interval; and*

*a secondary sync signal transmitter for transmitting a secondary sync signal at every transmission interval,*

*wherein the transmission interval (P) is at P=1 and at P=T/2+1, where T is a total number of slots in a frame and T>2,*

*the primary sync signal transmitted at P=1 is in a first location of the frame, and the primary sync signal transmitted at P=T/2+1 is in a second location of the frame, and*

*the second sync signal transmitted at P=1 is in a third location of the frame, and the second sync signal transmitted at P=T/2+1 is in a fourth location of the frame, the third and fourth locations being different from the first and second locations in the frame, and*

*wherein the first location at P=1 is offset by a predetermined time from a starting point of the frame, and the second location at P=T/2+1 is offset by the predetermined time from a half point of a total length of the frame.*

*43. The sync signal transmission apparatus as claimed in claim 42, wherein the third location at P=1 is offset by a predetermined time from the starting point of the frame, and the fourth location at P=T/2+1 is offset by a predetermined time from the half point of the total frame length.*

*44. The sync signal transmission apparatus as claimed in claim 42, wherein the primary and secondary sync signals comprise one symbol in time domain.*

*45. The sync signal transmission apparatus as claimed in claim 42, wherein the secondary sync signals are generated according to transmission duration information.*

*46. The sync signal transmission apparatus as claimed in claim 42, wherein the primary and secondary sync signals are transmitted on consecutive symbols in time domain.*

*47. The sync signal transmission apparatus as claimed in claim 42, wherein the secondary sync signals at the third and fourth locations uniquely specify a cell group or frame sync.*

*48. A synchronization (sync) signal receiving apparatus in a communication system, the apparatus comprising:*

*a primary sync signal receiver for receiving a primary sync signal at every transmission interval;*

*a secondary sync signal receiver for receiving a secondary sync signal at every transmission interval; and*

*a controller for acquiring a frame sync and a cell identification from the primary sync signal and the secondary sync signal,*

*wherein the transmission interval (P) is at P=1 and at P=T/2+1, where T is a total number of slots in the frame and T>2,*

*the primary sync signal transmitted at P=1 is in a first location of a frame, and the primary sync signal transmitted at P=T/2+1 is in a second location of the frame, and*

*the second sync signal transmitted at P=1 is in a third location of the frame, and the second sync signal transmitted at P=T/2+1 is in a fourth location of the frame, the third and fourth locations being different from the first and second locations in the frame,*

*wherein the first location at P=1 is offset by a predetermined time from a starting point of the frame, and the second location at P=T/2+1 is offset by the predetermined time from a half point of a total length of the frame.*

*49. The sync signal receiving apparatus as claimed in claim 48, wherein the third location at P=1 is offset by a predetermined time from the starting point of the frame, and the fourth location at P=T/2+1 is offset by a predetermined time from the half point of the total frame length.*

*50. The sync signal receiving apparatus as claimed in claim 48, wherein the primary and secondary sync signals comprise one symbol in time domain.*

*51. The sync signal receiving apparatus as claimed in claim 48, wherein the secondary sync signals are generated according to transmission duration information.*

*52. The sync signal receiving apparatus as claimed in claim 48, wherein the primary and secondary sync signals are received on consecutive symbols in time domain.*

*53. The sync signal receiving apparatus as claimed in claim 48, wherein the secondary sync signals at the third and fourth locations uniquely specify a cell group or the frame sync.*

* * * * *

UNITED STATES PATENT AND TRADEMARK OFFICE

CERTIFICATE OF CORRECTION

PATENT NO. : RE42,827 E
APPLICATION NO. : 11/440402
DATED : October 11, 2011
INVENTOR(S) : Moon et al.

It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*